(12) United States Patent
Nogami et al.

(10) Patent No.: US 8,414,396 B2
(45) Date of Patent: Apr. 9, 2013

(54) GAME SYSTEM, GAME APPARATUS, STORAGE MEDIUM STORING GAME PROGRAM, AND GAME CONTROLLING METHOD

(75) Inventors: Hisashi Nogami, Kyoto (JP); Kunihiro Komatsu, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 1867 days.

(21) Appl. No.: 11/367,434

(22) Filed: Mar. 6, 2006

(65) Prior Publication Data

US 2006/0247059 A1 Nov. 2, 2006

(30) Foreign Application Priority Data

Apr. 28, 2005 (JP) ................. 2005-131910

(51) Int. Cl.
*A63F 13/00* (2006.01)
(52) U.S. Cl.
USPC .............................................. 463/40; 463/43
(58) Field of Classification Search ............ 463/40, 463/42, 43; 709/208, 209, 227
See application file for complete search history.

(56) References Cited

U.S. PATENT DOCUMENTS

| | | | | |
|---|---|---|---|---|
| 6,383,075 B1 * | 5/2002 | Jeong et al. | ........... | 463/39 |
| 6,733,382 B2 * | 5/2004 | Oe et al. | ........... | 463/1 |
| 2002/0035604 A1 * | 3/2002 | Cohen et al. | ........... | 709/205 |
| 2004/0110563 A1 * | 6/2004 | Tanaka et al. | ........... | 463/39 |
| 2005/0159221 A1 * | 7/2005 | Kamikawa et al. | ........... | 463/42 |

FOREIGN PATENT DOCUMENTS

| | | |
|---|---|---|
| JP | 11-191097 | 7/1999 |
| JP | 2002-159755 | 6/2002 |
| JP | 2003-169964 | 6/2003 |
| JP | 2004-174091 | 6/2004 |
| JP | 2004-350910 | 12/2004 |
| JP | 2005-095601 | 4/2005 |

OTHER PUBLICATIONS

Usaka et al., "The multi-server MUD system for the digital museum", Information Processing Society of Japan, Sep. 24-26, 1997 [partial translation].

* cited by examiner

*Primary Examiner* — Sunit Pandya
*Assistant Examiner* — Allen Chan
(74) *Attorney, Agent, or Firm* — Nixon & Vanderhye P.C.

(57) ABSTRACT

A game system includes a plurality of game apparatuses, and the respective game apparatuses are connected so as to make a communication with each other. A virtual space in a communication game comprises a plurality of scenes. Out of the game apparatuses participating in each scene, a parent device (scene host) and a child device (scene visitor) of the scene are determined. During the game, the scene host performs an updating process of scene shared data to be shared with all the game apparatuses participating in the communication game and scene specific data to be shared with only the game apparatuses which exist in the scene where a user's own apparatus participates in.

26 Claims, 28 Drawing Sheets

(A) BEFORE SCENE VISITOR MOVES (B) AFTER SCENE VISITOR MOVES (A) BEFORE SCENE VISITOR MOVES (B) AFTER SCENE VISITOR MOVES (A) BEFORE SCENE HOST MOVES (B) AFTER SCENE HOST MOVES (A) BEFORE SCENE HOST MOVES (B) AFTER SCENE HOST MOVES

GAME SYSTEM, GAME APPARATUS, STORAGE MEDIUM STORING GAME PROGRAM, AND GAME CONTROLLING METHOD

CROSS REFERENCE TO RELATED APPLICATION

The disclosure of Japanese Patent Application No. 2005-131910 is incorporated herein by reference.

TECHNICAL FIELD

The exemplary embodiments disclosed herein relate to a game system, a game apparatus, a storage medium storing a game program, and a game controlling method. More specifically, the exemplary embodiments disclosed herein relate to a game system, a game apparatus, a storage medium storing a game program, and a game controlling method that are constructed by a plurality of game apparatuses with a communication function and allow each player to participate in a virtual game by use of his or her own game apparatus.

BACKGROUND AND SUMMARY

Conventionally, in a case of performing a communication game among a plurality of game apparatuses, in order to provide the same communication result between the game apparatuses, a method by which information obtained according to operations of the players of the respective game apparatuses are collected in a game apparatus (network parent device), matched with each other, and then transmitted to the rest of the game apparatuses (network child device) has been adopted. In a communication game where a parent device and a plurality of child devices make a communication with each other, it has been well known that a game apparatus as a parent device is changed in accordance with a predetermined condition. An example is disclosed in a Japanese Patent Laying-open No.2004-174091 [A63F 13/12] laid-open on Jun. 24, 2004. According to the communication game system, in a case of performing a communication game among a plurality of games, every time that a cycle of process is executed at a predetermined times, a game apparatus as a parent device is changed in turn. This makes it possible to prevent imbalance of advantage/disadvantage of the game to be given to the player, and fairly play the game.

In the game system, since the imbalance of advantage/disadvantage of the game is eliminated, it is effective in a battle game, and so on. However, a single game apparatus is always available as a network parent device, and as the number of the game apparatuses participating in the communication game is great, a processing load imposed on the network parent device is increased, resulting in occurrence of less communication efficiency.

Therefore, a feature of certain exemplary embodiments is to provide a novel game system, game apparatus, storage medium storing a game program, and game controlling method.

Another feature of certain exemplary embodiments is to provide a game system, a game apparatus, a storage medium storing a game program, and a game controlling method that can prevent communication efficiency from being reduced.

A game system according to certain exemplary embodiments includes a plurality of game apparatuses each having a communication function, and each of the plurality of game apparatuses participates as a player in any one of a scene of a virtual game space including a plurality of scenes. Each of the game apparatuses includes a shared game data storing means, a specific game data storing means, a parent device setting means, a child device setting means, a parent device processing means, and a child device processing means. The shared game data storing means stores the shared game data to be shared with all the game apparatuses. The specific game data storing means stores scene specific game data to be shared in only a scene where a user's own apparatus participates in. The parent device setting means sets the user's own apparatus as a parent device of the scene when none of the other game apparatuses participates in the scene where the user's own apparatus participates in. The child device setting means sets the user's own apparatus as a child device in the scene when any one of the other game apparatuses participates in the scene where the user's own apparatus participates in. The parent device processing means, at least, instructs all the game apparatuses except for the user's own apparatus to update the shared game data, or instructs all the child devices which participate in the scene to update the specific game data when the user's own apparatus is set as a parent device by the parent device setting means of the scene. The child device processing means, at least, updates the specific game data according to an instruction from the parent device when the user's own apparatus is set as a child device of the scene by the child device setting means.

More specifically, the game system (100: a reference numeral corresponding in the "detailed description" described later and so forth) comprises a plurality of game apparatuses (10) each having a communication function. Each of the plurality of game apparatuses (10) participates as a player in any one of a scene of a virtual game space (200) including a plurality of scenes, and plays a communication game. Each of the game apparatuses (10) includes a shared game data storing means (48, 760), a specific game data storing means (48, 762), a parent device setting means (42), a child device setting means (42), a parent device processing means (42, S5, S39, S73, S93) and a child device processing means (42, S35, S69, S89). The shared game data storing means (48, 760) comprises the system (100), and stores shared game data (760a, 760b, . . . ) to be shared with all the game apparatuses (10) playing the communication game. The specific game data storing means (48, 762) stores scene specific game data (762a) to be shared in only a scene where a user's own apparatus participates in. The parent device setting means (42) sets the user's own apparatus as a parent device (which may be called "scene host" in the embodiment) in the scene when none of the other game apparatuses (10) participates in (this is true for moving to another scene, and so forth) where the user's own apparatus participates in. The child device setting means (42) sets the user's own apparatus as a child device (which may be called "scene visitor" in the embodiment) when any one of the other game apparatuses (10) participates in the scene where the user's own apparatus participates in. The parent device processing means (42, S5, S39, S73, S93), at least, instructs all the game apparatuses (10) except for the user's own apparatus to update the shared game data, or instructs all the child devices which participate in the scene to update the specific game data when the user's own apparatus is set as a parent device by the parent device setting means of the scene. Accordingly, a scene host set for each scene shares a processing of the communication game. On the other hand, the child device processing means (42, S35, S69, S89), at least, updates the specific game data according to an instruction from the parent device when the user's own apparatus is set as a scene visitor.

According to certain exemplary embodiments, since a parent device set for each scene shares a processing, and therefore, it is possible to prevent a processing from being concentrated on a single game apparatus. Thus, it is possible to prevent communication efficiency from being reduced due to the increase of the number of the game apparatuses participating in the communication game.

In one exemplary embodiment, the child device processing means includes a shared game data update requesting means for requesting the parent device of the scene where the user's own apparatus participates in to update the shared game data, and the parent device processing means instructs all the game apparatuses except for the user's own apparatus to update the shared game data on receipt of the update request of the shared game data from the child device. More specifically, as to the scene visitor, the shared game data update requesting means (42, S147) requests the scene host of the scene where the user's own apparatus participates in to update the shared game data (760a, 760b, . . . ). The scene host instructs all the game apparatuses (10) except for the user's own apparatus to update the shared game data (760a, 760b, . . . ) (S121) on receipt of the update request of the shared game data from the child device (S117). Thus, the child device requests the parent device participating in the same scene to update the shared game data, and in response thereto, the parent device requests all the game apparatuses to update the shared game data, and therefore, it is possible to share an instructing process of update of the game data with the respective parent devices. That is, the process is dispersed to prevent communication efficiency from being reduced.

In one aspect of certain exemplary embodiments, the game apparatus further includes an update instruction receiving means for receiving an update instruction of the shared game data from any one of the other game apparatuses, and a shared game data updating means for updating the shared game data on receipt of an update instruction of the shared game data by the update instruction receiving means. More specifically, the game apparatus (10) further includes an update instruction receiving means (42, S129, S151, S159) and a shared game data updating means (42, S131, S153, S161). The update instruction receiving means (42, S129, S151, S159) receives an update instruction of the shared game data (760a, 760b, . . . ) from the scene host existing in the same scene or another scene. The shared game data updating means (42, S131, S153, S161) updates the shared game data (760a, 760b, . . . ) in response to reception of the update instruction ("YES" in S129, S151, S159). Accordingly, in response to an instruction from the parent device in the same scene or another scene, each game apparatus can update the shared game data.

In another aspect of certain exemplary embodiments, the game apparatus further includes a child device presence or absence determining means for determining whether or not a child device exists in a current scene in a case that the user's own apparatus is a parent device after moving to another scene, and a parent device setting request means for requesting one child device selected according to a predetermined rule to become a parent device when it is determined that a child device exists in the current scene by the child device presence or absence determining means. More specifically, the game apparatus (10) further includes a child device presence or absence determining means (42, S209) and a parent device setting request means (42, S209). The child device presence or absence determining means (42, S213) determines whether or not a child device exists in the current scene in a case that the user's own apparatus is a parent device after it moves to another scene ("YES" in S207). The parent device setting request means (42, S213) requests one child device selected according to a predetermined rule to become a parent device when it is determined that a child device exists in the current scene ("YES" in S209). For example, referring to a communication ID assigned to the child devices, a child device having a communication ID low in number is selected. Or, a communication ID (child device) is selected at random. Accordingly, when a parent device moves to another scene, in a case that a child device exists in the scene, the parent device requests any one of the child device to become a parent device, and thus, the requested child device can execute a process as a parent device.

In one exemplary embodiment, the game apparatus further includes a parent device setting request determining means for determining whether or not the user's own apparatus is requested to become a parent device from any one of the other game apparatuses, and a setting modification means for setting the user's own apparatus as a parent device when it is determined that the user's own apparatus is requested to become a parent device by the parent device setting request determining means. More specifically, the game apparatus (10) further includes a parent device setting request determining means (42, S237) and a setting modification means (42, S239). The parent device setting request determining means (42, S237) determines whether or not the user's own apparatus is requested to become a parent device from any one of the other game apparatuses (10), that is, the current parent device. The setting modification means (42, S239) sets the user's own apparatus as a parent device when it is determined that the user's own apparatus is requested to become a parent device ("YES" in S237). Thus, the game apparatus requested to become a parent device is set to a parent device in the scene, and therefore, it is possible to prevent the subsequent process in the scene from being delayed.

In the other aspect of certain exemplary embodiments, the game apparatus further includes a scene information storing means for storing scene identification information as to a scene where each of the game apparatuses participates in and parent/child setting information for indicating whether each of the game apparatuses is set to become a parent device or a child device. More specifically, the game apparatus (10) further includes a scene information storing means (48, 78), and the scene information storing means (48, 78) stores scene information. The scene information includes scene identification information (780) as to a scene where each of the game apparatuses (10) participates in and parent/child setting information (782) for indicating whether each of the game apparatuses (10) is set to become a parent device or a child device. That is, the scene information is stored, each game apparatus can knows which scene all the game apparatuses including the user's own apparatus participate in, and also know whether respective one of all the game apparatuses including the user's own apparatus is a parent device or a child device in the scene.

In one exemplary embodiment, the game apparatus further includes a scene information updating means for updating the scene information at least when the user's own apparatus moves to another scene. More specifically, the game apparatus (10) further includes a scene information updating means (42, S23, S77), and the scene information updating means (42, S23, S77) updates the scene information at least when the user's own apparatus moves to another scene ("YES" in S171). That is, at least any one of the scene identification information (780) and the parent device setting information (782) is changed. This is because that in a case that the apparatus is requested to become a parent device as described above, and its setting is changed to a parent device ("YES" in step S173), only the parent device setting information (782) is changed. Additionally, since the scene information is information as to all the game apparatuses, an updating instruction may be sent from another game apparatus (10). That is, because the scene information is updated, it is possible know the latest scene information of all the game apparatuses.

A game apparatus according to certain exemplary embodiments participates in a virtual space including a plurality of scenes as a player, and plays a communication game. The game apparatus includes a shared game data storing means, a specific game data storing means, a parent device setting means, a child device setting means, a parent device processing means, and a child device processing means. The shared game data storing means stores shared game data to be shared with all the game apparatuses playing the communication game. The specific game data storing means stores scene specific game data to be shared in only a scene where a user's own apparatus participates in. The parent device setting means sets the user's own apparatus as a parent device of the scene when none of the other game apparatuses participates in the scene where the user's own apparatus participates in. The child device setting means sets the user's own apparatus as a child device in the scene when any one of the other game apparatuses participates in the scene where the user's own apparatus participates in. The parent device processing means, at least, instructs all the game apparatuses except for the user's own apparatus to update the shared game data, or for instructing all the child devices which participate in the scene to update the specific game data when the user's own apparatus is set as a parent device of the scene by the parent device setting means. Then, the child device processing means, at least, updates the specific game data according to an instruction from the parent device when the user's own apparatus is set as a child device of the scene by the child device setting means.

Also, according to certain exemplary embodiments of the game apparatus, it is possible to prevent communication efficiency from being reduced by sharing processes among apparatuses similarly to the certain exemplary embodiments of the above-described game system.

A storage medium storing a game program according to the present invention is a storage medium storing a game program of a game apparatus which participates in a virtual space including a plurality of scenes as a player, and plays a communication game. The game apparatus includes a shared game data storing means for storing shared game data to be shared with all the game apparatuses playing the communication game, and a specific game data storing means for storing scene specific game data to be shared in only a scene where a user's own apparatus participates in. The game program executes a processor of the game apparatus to execute a parent device setting step, a child device setting step, a parent device processing step, and a child device processing step. The parent device setting step sets the user's own apparatus as a parent device of the scene when none of the other game apparatuses participates in the scene where the user's own apparatus participates in. The child device setting step sets the user's own apparatus as a child device in the scene when any one of the other game apparatuses participates in the scene where the user's own apparatus participates in. The parent device processing step, at least, instructs all the game apparatuses except for the user's own apparatus to update the shared game data, or instructs all the child devices which participate in the scene to update the specific game data when the user's own apparatus is set as a parent device of the scene by the parent device setting step. Then, the child device processing step, at least, updates the specific game data according to an instruction from the parent device when the user's own apparatus is set as a child device of the scene by the child device setting step.

Also, it is possible to prevent communication efficiency from being reduced by sharing processes among the apparatuses similarly to the invention of the above-described game system.

A game controlling method according to the present invention is a game controlling method of a game apparatus which participates in a virtual space including a plurality of scenes as a player and plays a communication game, and comprises a shared game data storing means for storing shared game data to be shared with all the game apparatuses playing the communication game, and a specific game data storing means for storing scene specific game data to be shared in only a scene where a user's own apparatus participates in. The game controlling method (a) sets the user's own apparatus as a parent device of the scene when none of the other game apparatuses participates in the scene where the user's own apparatus participates in, (b) sets the user's own apparatus as a child device in the scene when any one of the other game apparatuses does not participate in the scene where the user's own apparatus participates in, (c) instructs, at least, all the game apparatuses except for the user's own apparatus to update the shared game data, or instructs all the child devices which participate in the scene to update the specific game data when the user's own apparatus is set as a parent device of the scene by the step (a), and (d) at least updates the specific game data according to an instruction from the parent device when the user's own apparatus is set as a child device of the scene by the step (b).

Also, it is possible to prevent communication efficiency from being reduced by sharing processes among the apparatuses similarly to the invention of the above-described game system.

The above described objects and other objects, features, aspects and advantages of the present invention will become more apparent from the following detailed description of the present invention when taken in conjunction with the accompanying drawings.

DETAILED DESCRIPTION

Figure 1:
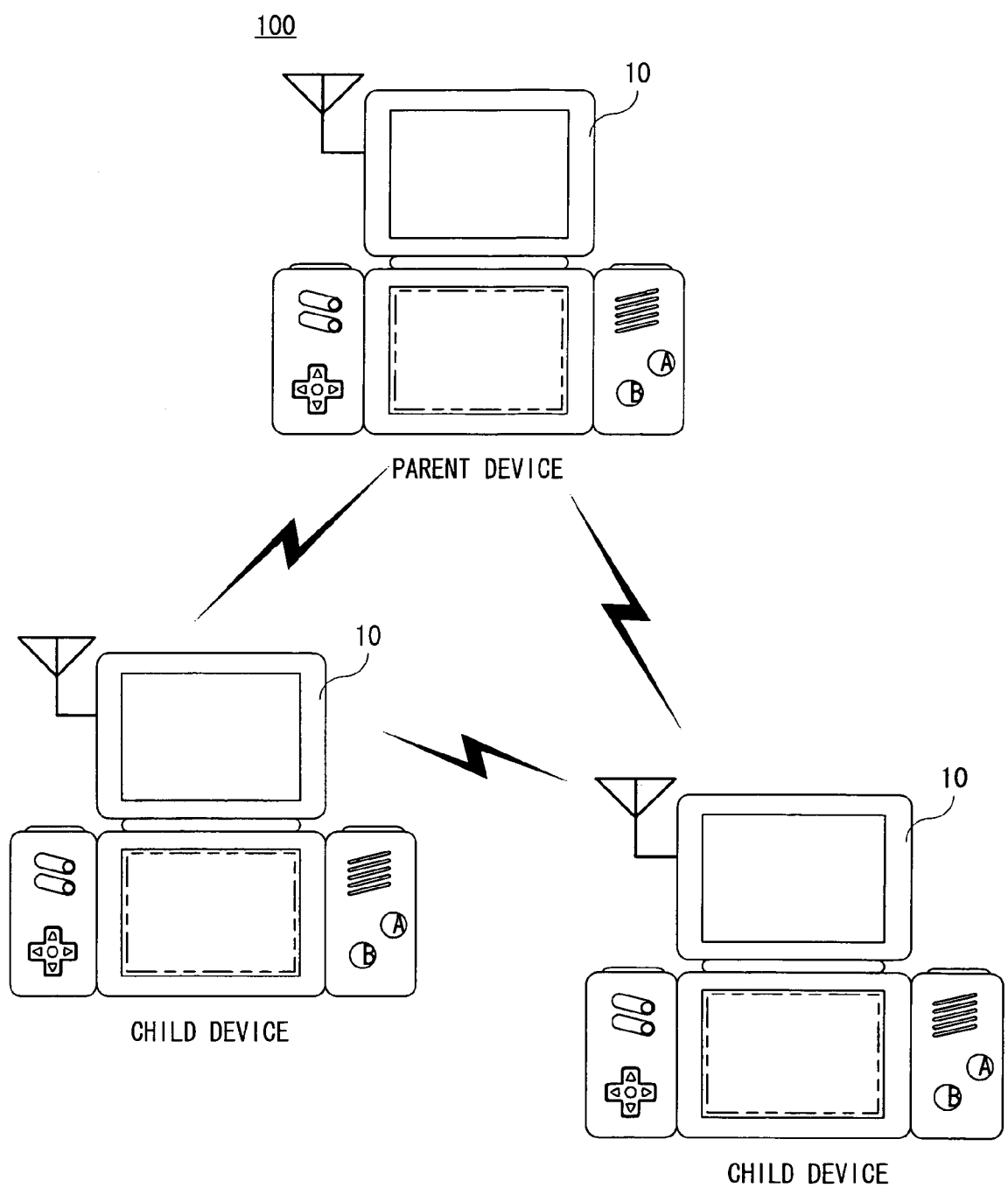
FIG. 1 is an illustrative view showing a game system according to certain exemplary embodiments.

Referring to FIG. 1, a game system (hereinafter simply referred to as "system") 100 of a certain exemplary embodiment includes a plurality of game apparatuses 10. In FIG. 1, a system 100 is comprised of three game apparatuses 10, but two or more apparatuses is enough, and therefore, this may be comprised of four or more game apparatuses. In the system 100, each of the plurality of game apparatuses 10 is connected to make a communication with each other (wireless communication in this exemplary embodiment), and one game apparatus 10 may be called "parent device (for the sake of convenience, hereinafter referred to as "network parent device"), other game apparatuses 10 except for the network parent device is a child device (for the sake of convenience, hereinafter referred to as "network child device").

Here, there are various methods for determining a network parent device. For example, a game apparatus whose button is first operated after a wireless communication is started can be determined as a network parent device. In addition, when the network parent device is determined, game apparatuses 10 except for this is determined as a network child device. It is noted that in order to identify each of the network child devices, the network parent device assigns identification information or an identification number (hereinafter referred to as "communication ID") to each of the network child devices.

Figure 2:
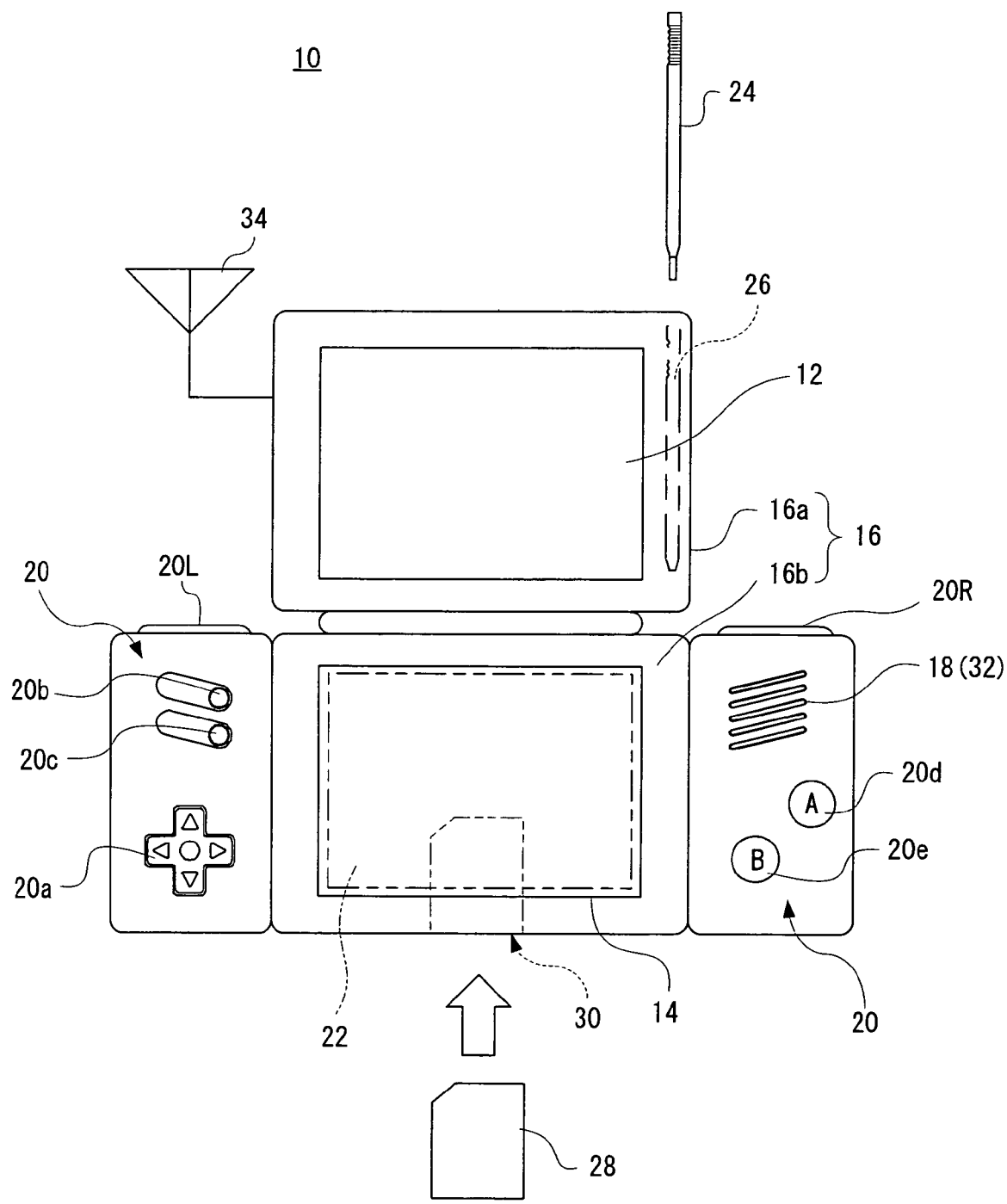
FIG. 2 is an illustrative view showing one example of a game apparatus shown in FIG. 1 exemplary embodiment.

FIG. 2 is an illustrative view showing an appearance of the game apparatus 10 shown in FIG. 1. With referring to FIG. 2, the game apparatus 10 includes a first liquid crystal display (LCD) 12 and a second LCD 14. The LCD 12 and the LCD 14 are provided on a housing 16 so as to be arranged in a predetermined position. In this exemplary embodiment, the housing 16 comprises an upper housing 16a and a lower housing 16b, and the LCD 12 is provided on the upper housing 16a while the LCD 14 is provided on the lower housing 16b. Accordingly, the LCD 12 and the LCD 14 are closely arranged so as to be longitudinally (vertically) parallel with each other.

It is noted that although the LCD is utilized as a display in this exemplary embodiment, an EL (Electronic Luminescence) display and a plasma display may be used in place of the LCD.

As can be understood from FIG. 2, the upper housing 16a has a plane shape little larger than a plane shape of the LCD 12, and has an opening formed so as to expose a display surface of the LCD 12 from one main surface thereof. On the other hand, the lower housing 16b has a plane shape horizontally longer than the upper housing 16a, and has an opening formed so as to expose a display surface of the LCD 14 at an approximately center of the horizontal direction. Furthermore, the lower housing 16b is provided with a sound release hole 18 and an operating switch 20 (20a, 20b, 20c, 20d, 20e, 20L and 20R).

In addition, the upper housing 16a and the lower housing 16b are rotatably connected at a lower side (lower edge) of the upper housing 16a and a part of an upper side (upper edge) of the lower housing 16b. Accordingly, in a case of not playing a game, for example, if the upper housing 16a is rotated to fold such that the display surface of the LCD 12 and the display surface of the LCD 14 are face to face with each other, it is possible to prevent the display surface of the LCD 12 and the display surface of the LCD 14 from being damaged such as a flaw, etc. It is noted that the upper housing 16a and the lower housing 16b are not necessarily rotatably connected with each other, and may alternatively be provided integrally (fixedly) to form the housing 16.

The operating switch 20 includes a direction instructing switch (cross switch) 20a, a start switch 20b, a select switch 20c, an action switch (A button) 20d, an action switch (B button) 20e, an action switch (L button) 20L, and an action switch (R button) 20R. The switches 20a, 20b and 20c are placed at the left of the LCD 14 on the one main surface of the lower housing 16b. Also, the switches 20d and 20e are placed at the right of the LCD 14 on the one main surface of the lower housing 16b. Furthermore, the switches 20L and 20R are placed in a part of an upper edge (top surface) of the lower housing 16b at a place except for a connected portion, and lie of each side of the connected portion with the upper housing 16a.

The direction instructing switch 20a functions as a digital joystick, and is utilized for instructing a moving direction of a player character (or player object) to be operated by a player, instructing a moving direction of a cursor, and so forth by operating at least any one of four depression portions. The start switch 20b is formed by a push button, and is utilized for starting (restarting), temporarily stopping (pausing) a game, and so forth. The select switch 20c is formed by the push button, and utilized for a game mode selection, etc.

The action switch 20d, that is, the A button 20d is formed by a push button, and allows the player character to perform an arbitrary action, except for instructing the direction, such as hitting (punching), throwing, holding (obtaining), riding, jumping, etc. For example, in an action game, it is possible to apply an instruction of jumping, punching, moving arms, etc. In a role-playing game (RPG) and a simulation RPG, it is possible to apply an instruction of obtaining an item, selecting and determining arms or command, etc. The action switch 20e, that is, the B button 20e is formed by a push button, and is utilized for changing a game mode selected by the select switch 20c, canceling an action determined by the A button 20d, and so forth.

The action switch (left push button) 20L and the action switch (right push button) 20R are formed by a push button, and the left push button (L button) 20L and the right push button (R button) 20R can perform the same operation as the A button 20d and the B button 20e, and also function as a subsidiary of the A button 20d and the B button 20e.

Also, on a top surface of the LCD 14, a touch panel 22 is provided. As the touch panel 22, any one of a resistance film system, an optical system (infrared rays system), and an electrostatic capacitive coupling system, for example, can be utilized. When being operated by depressing, stroking, touching, and so forth with a stick 24, a pen (stylus pen), or a finger (hereinafter referred to as "stick 24, etc.") on a top surface (detection surface) thereof, the touch panel 22 detects coordinates of the position pointed by the stick 24, etc., and outputs coordinates data corresponding to the detected coordinates.

In this exemplary embodiment, a resolution of the display surface of the LCD 14 is 256 dots×192 dots (this is true or roughly true for the LCD 12), and a detection accuracy of a detection surface of the touch panel 22 is also rendered 256 dots×192 dots in correspondence to the resolution of the display surface. It is noted that detection accuracy of the touch panel 22 may be lower than the resolution of the display surface of the LCD 14, or higher than it.

Display screens like different game screens may be displayed on the LCD12 and the LCD 14. Furthermore, a game screen for playing the game may be displayed on the one LCD (LCD12 in this exemplary embodiment), and a game screen (operation screen) for inputting textual information for operating the game and pointing an icon may be displayed on the other LCD (LCD 14 in this exemplary embodiment). Accordingly, the player is able to input texture information (command), point an icon (or a predetermined image), etc. on the screen of the LCD 14 by operating the touch panel 22 with the use of the stick 24, etc.

Thus, the game apparatus 10 has the LCD 12 and the LCD 14 as a display portion of two screens, and by providing the touch panel 22 on an upper surface of any one of them (LCD 14 in this exemplary embodiment), the game apparatus 10 has the two screens (LCD 12, 14) and the operating portions (20, 22).

Furthermore, in this exemplary embodiment, the stick 24 can be inserted into a housing portion (housing slot) 26 provided in proximity to a side surface (right side surface) of the upper housing 16a, for example, and taken out therefrom as necessary. It is noted that in a case of preparing no stick 24, it is not necessary to provide the housing portion 26.

Also, the game apparatus 10 includes a memory card (or game cartridge) 28. The memory card 28 is detachable, and inserted into a loading slot 30 provided on a rear surface or a lower edge (bottom surface) of the lower housing 16b. Although omitted in FIG. 2, a connector 46 (see FIG. 3) is provided at a depth portion of the loading slot 30 for connecting a connector (not shown) provided at an end portion of the memory card 28 in the loading direction, and when the memory card 28 is loaded into the loading slot 30, the connectors are connected with each other, and therefore, the memory card 28 is accessible by a CPU core 42 (see FIG. 3) of the game apparatus 10.

Additionally, the game apparatus 10 includes an antenna 34, and can make a communication in a wireless manner by transmitting and receiving weak radio wave from another game apparatus 10 with the use of the antenna 34, for example. Although a detailed description is omitted here, the weak radio wave transmitted and received by the game apparatus 10 in this exemplary embodiment is set in intensity to such a degree so as not to be restricted by the Radio Law.

It is noted that although not illustrated in FIG. 2, a speaker 32 (see FIG. 3) is provided at a position corresponding to the sound release hole 18 inside the lower housing 16b.

Furthermore although omitted in FIG. 2, for example, a battery accommodating box is provided on a rear surface of the lower housing 16b, and a power switch, a volume switch, an external expansion connector, an earphone jack, etc. are provided on a bottom surface of the lower housing 16b.

Figure 3:
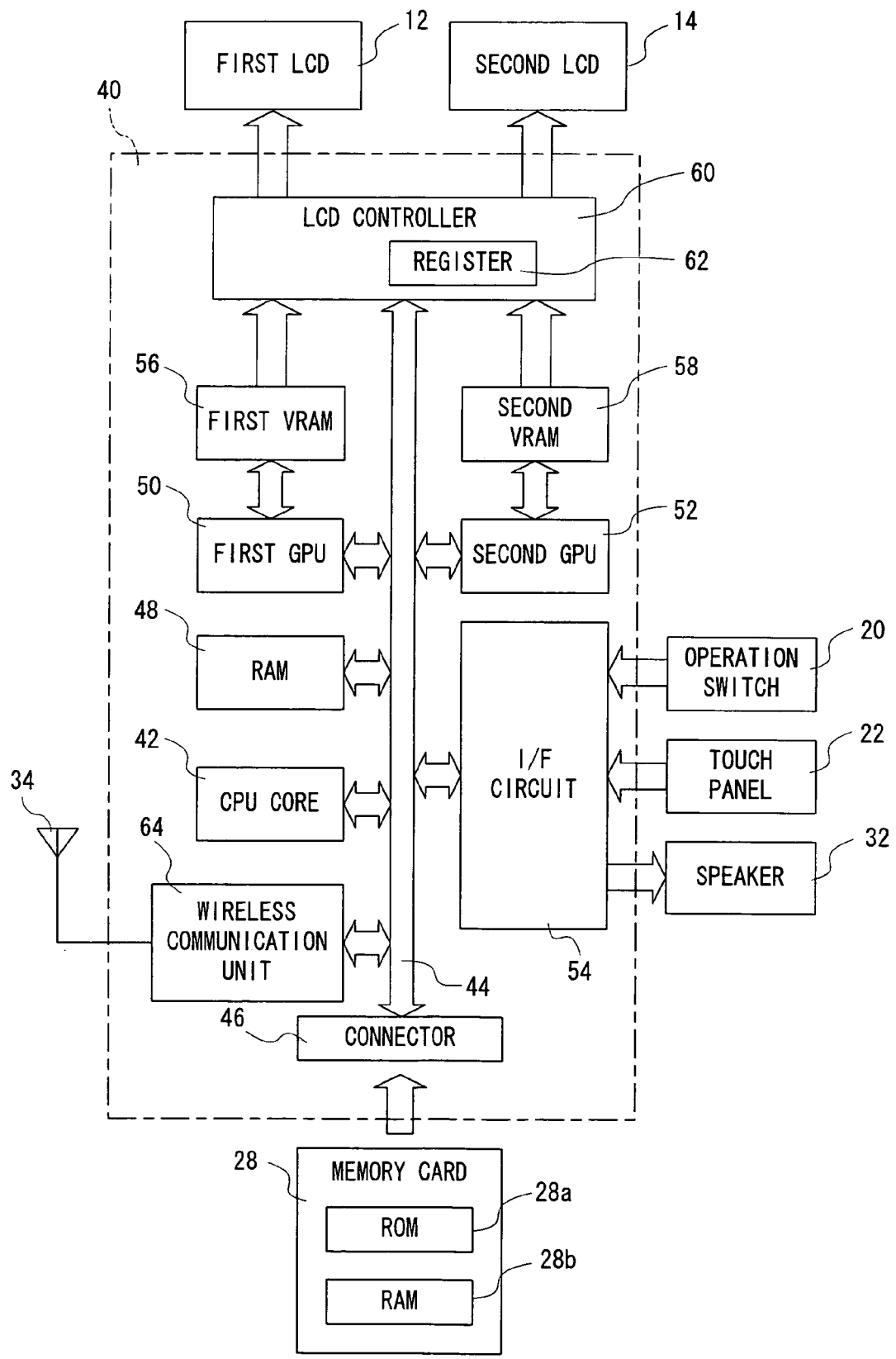
FIG. 3 is a block diagram showing an electric configuration of the game apparatus shown in FIG. 2.

FIG. 3 is a block diagram showing an electrical configuration of the game apparatus 10. Referring to FIG. 3, the game apparatus 10 includes an electronic circuit board 40, and on the electronic circuit board 40, a circuit component such as the CPU core 42, etc. is mounted. The CPU core 42 is connected to the connector 46 via a bus 44, and is connected with a RAM 48, a first graphics processing unit (GPU) 50, a second GPU 52, an input-output interface circuit (hereinafter, referred to as "I/F circuit") 54, and an LCD controller 60.

The connector 46 is detachably connected with the memory card 28 as described above. The memory card 28 includes a ROM 28a and a RAM 28b, and although illustration is omitted, the ROM 28a and the RAM 28b are connected with each other via a bus and also connected with a connector (not shown) to be connected with the connector 46. Accordingly, the CPU core 42 gains access to the ROM 28a and the RAM 28b as described above.

The ROM 28a stores in advance a game program for a game (virtual game) to be executed by the game apparatus 10, image data (character image, background image, item image, icon (button) image, message image, cursor image etc.), data of the sound (music) necessary for the game (sound data), etc. An item selection processing program according to this invention is stored in the ROM 28a in advance in this exemplary embodiment. The RAM (backup RAM) 28b stores (saves) proceeding data and result data of the game.

The RAM 48 is utilized as a buffer memory or a working memory. That is, the CPU core 42 loads the game program, the image data, the sound data, etc. stored in the ROM 28a of the memory card 28 into the RAM 48, and executes a process according to the loaded game program. The CPU core 42 executes a game process while storing in the RAM 48 data (game data, flag data, etc.) temporarily generated in correspondence with a progress of the game.

It is noted that the game program, the image data, the sound data, etc. are loaded from the ROM 28a entirely at a time, or partially and sequentially as necessary so as to be stored (loaded) into the RAM 48.

Each of the GPU 50 and the GPU 52 forms a part of a rendering means, is constructed by, for example, a single chip ASIC, and receives a graphics command (construction command) from the CPU core 42 to generate game image data according to the graphics command. It is noted that the CPU core 42 applies to each of the GPU 50 and the GPU 52 an image generating program (included in the game program) required to generate the game image data in addition to the graphics command.

Furthermore, the GPU 50 is connected with a first video RAM (hereinafter referred to as "VRAM") 56, and the GPU 52 is connected with a second VRAM 58. The GPU 50 and the GPU 52 respectively gain access to the first VRAM 56 and the second VRAM 58 to fetch data (image data: data such as character data, texture, etc.) required to execute the construction command. It is noted that the CPU core 42 writes image data necessary for rendering to the first VRAM 56 and the second VRAM 58 through the GPU 50 and the GPU 52. The GPU 50 accesses the VRAM 56 to create the game image data for rendering. The GPU 52 accesses the VRAM 58 to create the game image data for rendering.

The VRAM 56 and the VRAM 58 are connected to the LCD controller 60. The LCD controller 60 includes a register 62, and the register 62 comprises, for example, one bit, and stores a value of "0" or "1" (data value) according to an instruction of the CPU core 42. The LCD controller 60 outputs the game image data created by the GPU 50 to the LCD 12, and outputs the game image data rendered by the GPU 52 to the LCD 14 in a case that the data value of the register 62 is "0". Furthermore, the LCD controller 60 outputs the game image data created by the GPU 50 to the LCD 14, and outputs the game image data rendered by the GPU 52 to the LCD 12 in a case that the data value of the register 62 is "1".

It is noted that the LCD controller 60 can directly read the image data from the VRAM 56 and the VRAM 58, or read the image data from the VRAM 56 and the VRAM 58 via the GPU 50 and the GPU 52.

The I/F circuit 54 is connected with the operating switch 20, the touch panel 22 and the speaker 32. Here, the operating switch 20 is the above-described switches 20a, 20b, 20c, 20d, 20e, 20L and 20R, and in response to an operation of the operating switch 20, a corresponding operation signal (operation data) is input to the CPU core 42 via the I/F circuit 54. Furthermore, coordinates data from the touch panel 22 is input to the CPU core 42 via the I/F circuit 54. In addition, the CPU core 42 reads from the RAM 48 the sound data necessary for the game such as a game music (BGM), a sound effect or voices of a game character (onomatopoeic sound), etc., and outputs it from the speaker 32 via the I/F circuit 54.

Additionally as shown in FIG. 2, the game apparatus 10 is connected with an antenna 34, and the antenna 34 is connected to a wireless communication unit 64. The wireless communication unit 64 is connected to the CPU core 42 via a bus 44. When the CPU core 42 applies game data and a command to the wireless communication unit 64, the wireless communication unit 64 converts the game data, etc. into an analog signal to send (transmit) it by weak radio wave through the antenna 34. Also, the wireless communication unit 64 receives a weak radio wave sent from another game apparatus 10 through the antenna 34, separates an analog signal from the received weak radio wave so as to convert it into a digital signal, and then applies it to the CPU core 42. This enables a wireless communication with another game apparatus 10. Accordingly, in the system 100, respective game apparatuses 10 make a communication with each other to play the same virtual game (communication game).

Conventionally, in a case of performing a communication game among a plurality of game apparatuses, in order to provide the same communication result among the respective game apparatuses, a method by which information obtained from the operations of the respective game apparatuses by the players are collected in one game apparatus (network parent device), matched with each other, and then transmitted to the rest of the game apparatuses (network child device) has been adopted. In a game system performing such a communication game, in order to prevent imbalance of advantage/disadvantage of the game to be given to the player, every time that a cycle of process is executed at predetermined times, a game apparatus as a network parent device is changed in turn.

However, a single game apparatus is always available as a network parent device, and as the number of the game apparatuses participating in the communication game is large, a processing load imposed on the network parent device is increased, resulting in reduction in communication efficiency.

Here, in this exemplary embodiment, in a case of playing a communication game in a virtual space including a plurality of scenes (places), a parent device (hereinafter referred to as "scene host" for the sake of explanation) and a child device (hereinafter referred to as "scene visitor" for the sake of explanation) are determined for each scene, allowing the processes to be shared among the respective scene hosts. That is, it is possible to prevent a process from being concentrated on a network parent device.

Figure 4:
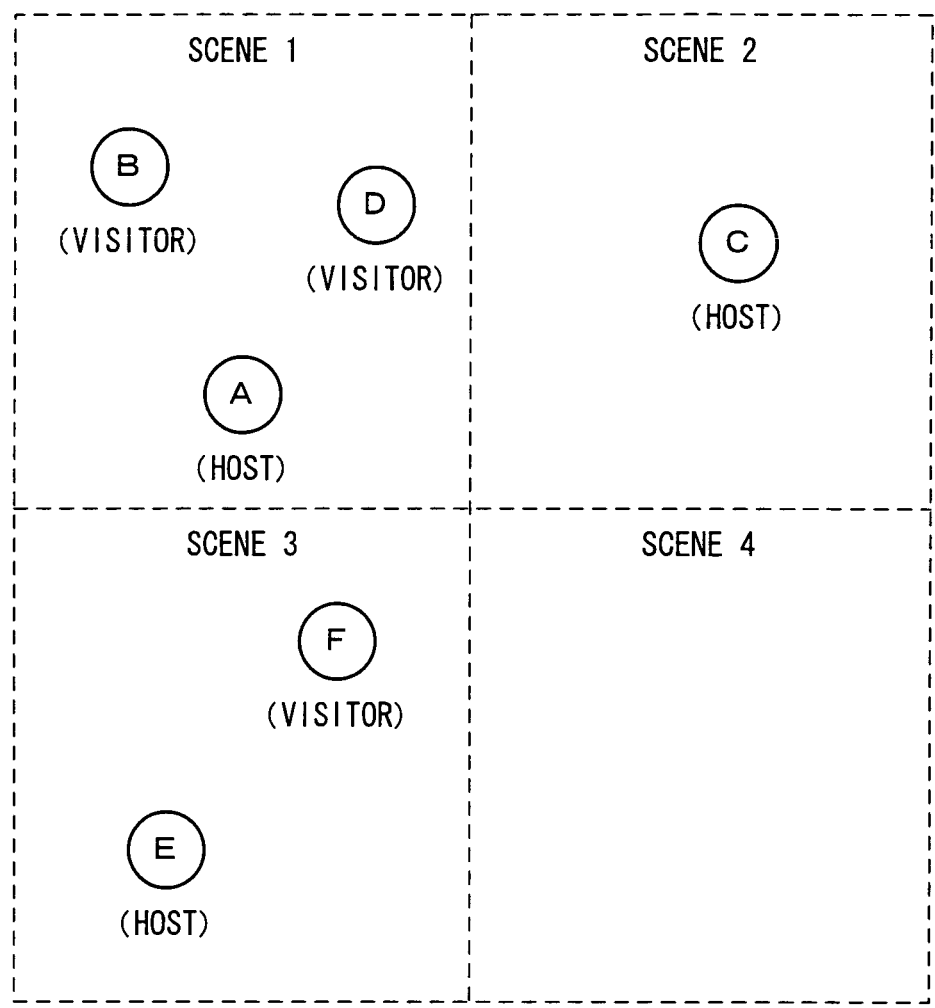
FIG. 4 is a plane view showing, in a divided manner for each scene, a virtual space 200 of a communication game playable in the game system of FIG. 1 exemplary embodiment.

FIG. 4 is an illustrative view showing a virtual space 200 of a virtual game (communication game) to be executed in the system 100 in a two-dimensional plane. For example, the virtual space 200 includes four scenes (scene 1, scene 2, scene 3, scene 4). It is noted that in FIG. 4 example, each of the game apparatuses 10 (hereinafter my be referred to as A, B, C, D, E, F for the sake of identification) making up the system 100 is represented in circle, and illustrated within a frame in dotted line illustrating borders between the respective scenes. Thus, it is possible to represent a state in which each of the apparatuses participates in the scene as a player. As described above, the game apparatuses A-F can be communicated with each other. In addition, in FIG. 4, for the sake of simplicity, each of the four scenes is illustrated in a square shape. For example, a scene of town, a scene inside the building, etc. are provided within the virtual space 200. It is noted that the scene varies depending on the kinds of the game, and this is an item to be designed by a programmer or a developer of the game.

In an example shown in FIG. 4, in the scene 1, the game apparatus A, the game apparatus B, and the game apparatus D participate. In the scene 2, the game apparatus C participates. In the scene 3, the game apparatus E and the game apparatus F participate. Then, in the scene 4, no game apparatus 10 participates. Also, in the scene 1, the game apparatus A is a scene host (simply represented as "host" in Figures, and so on), and the game apparatus B and the game apparatus D are scene visitors (simply represented as "visitor" in Figures, and so forth). In the scene 2, the game apparatus C is a scene host, and the scene visitor is absent. In the scene 3, the game apparatus E is a scene host, and the game apparatus F is a scene visitor.

Utilizing FIG. 4 example, a description is made on how the scene host is set in each scene, and how the game apparatus 10 (scene host or scene visitor) moves to different scene. It is noted that the method (process) of how the game apparatus 10 participates in a desired scene at a start of a wireless communication (communication game) is the same as a case that the game apparatus 10 moves from one scene to another scene, and therefore, a detailed description thereof will be omitted.

Figure 5:
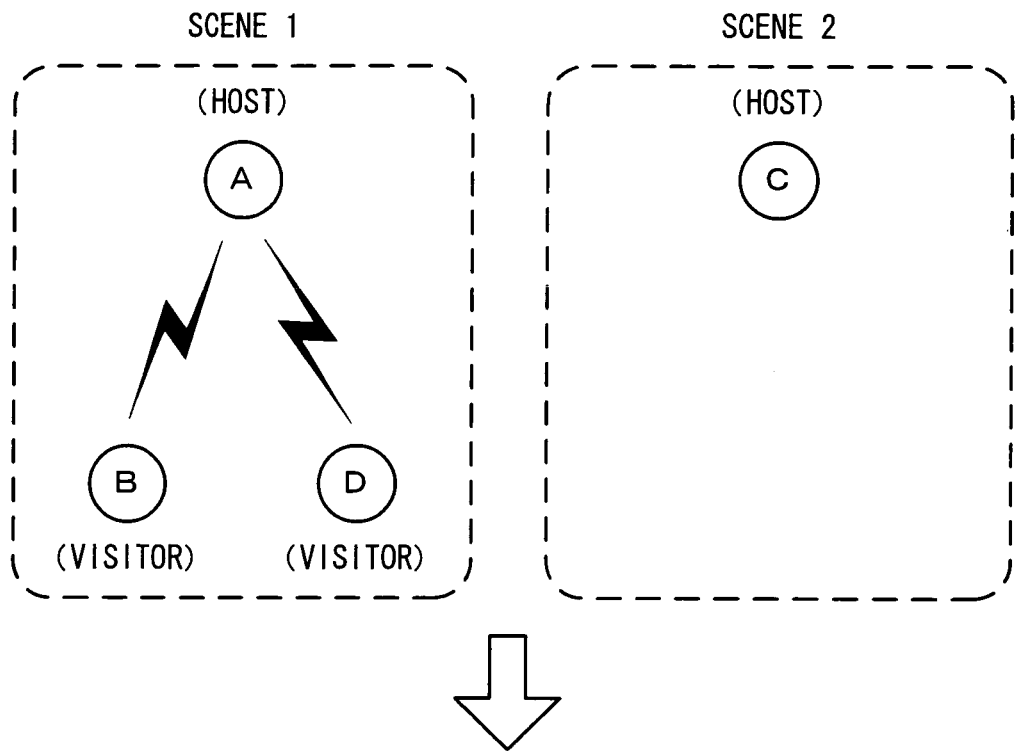
FIG. 5 is an illustrative view showing one example of a state in which a scene visitor moves to another scene in the communication game playable in the game system of FIG. 1 exemplary embodiment.
Figure 5:
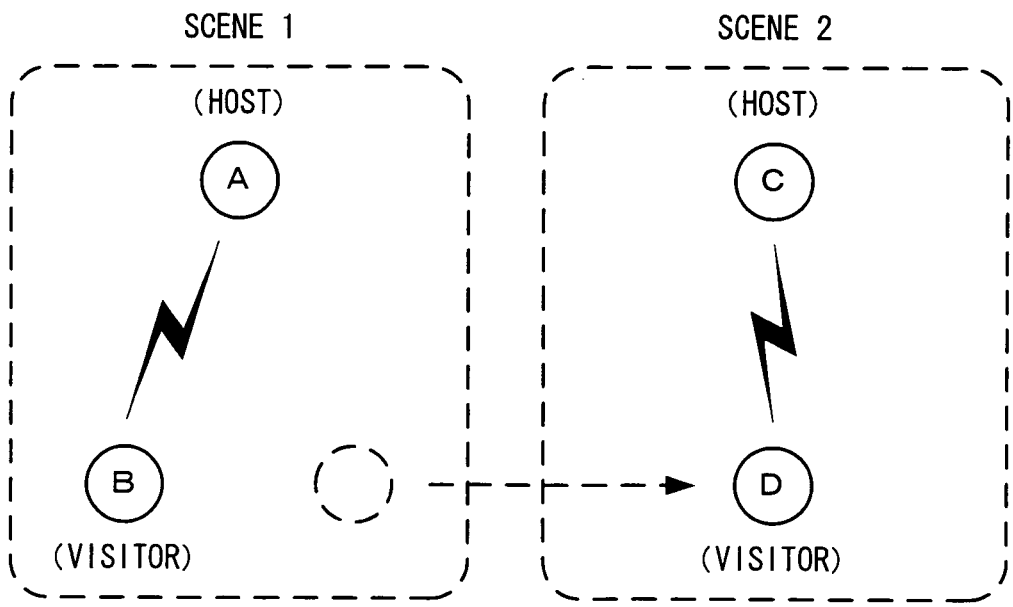

FIG. 5 is an illustrative view showing one example of a case in which a scene visitor existing in a certain scene moves to another scene. More specifically, the example shows that the game apparatus D as a scene visitor of the scene 1 moves to the scene 2. That is, FIG. 5(A) is a state before the game apparatus D as a scene visitor of the scene 1 moves to the scene 2, and FIG. 5(B) is a state after the game apparatus D moves to the scene 2.

It is noted that hereafter, for the sake of simplicity, the scene host of the scene 1 may be called "scene 1 host", and the scene visitor of the scene 1 may be called "scene 1 visitor". Although description is omitted, the same is true for scene hosts and scene visitors as to the other scenes (scene 2, scene 3, scene 4 in this exemplary embodiment).

As shown in FIG. 5(A) and FIG. 5(B), in the scene 2, since the game apparatus C as a scene 2 host exists, that is, another game apparatus 10 has already existed, the game apparatus D results in participating in the scene 2 as a scene visitor. That is, when the game apparatus D moves to the scene 2, it is set as a scene visitor. As described in detail later, in a case that a game apparatus 10 moves (participates in) to another scene, a setting as to a role (scene host or scene visitor) in the scene in which the game apparatus now participates is canceled. That is, scene information to be described later is updated.

It is noted that when a game apparatus 10 participates in a desired scene at a start of making a communication game, the game apparatus 10 is set as a scene visitor similarly to a case that the game apparatus participates in a scene where another game apparatus has already existed.

Figure 6:
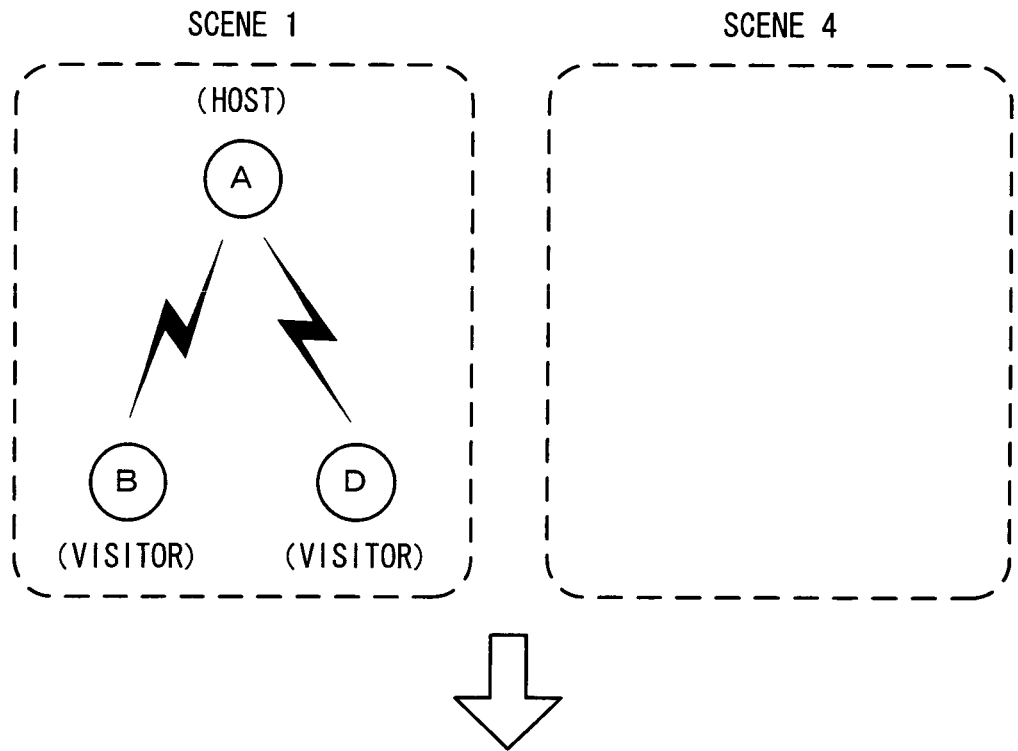
FIG. 6 is an illustrative view showing another example of a state in which the scene visitor moves to another scene in the communication game playable in the game system of FIG. 1 exemplary embodiment.
Figure 6:
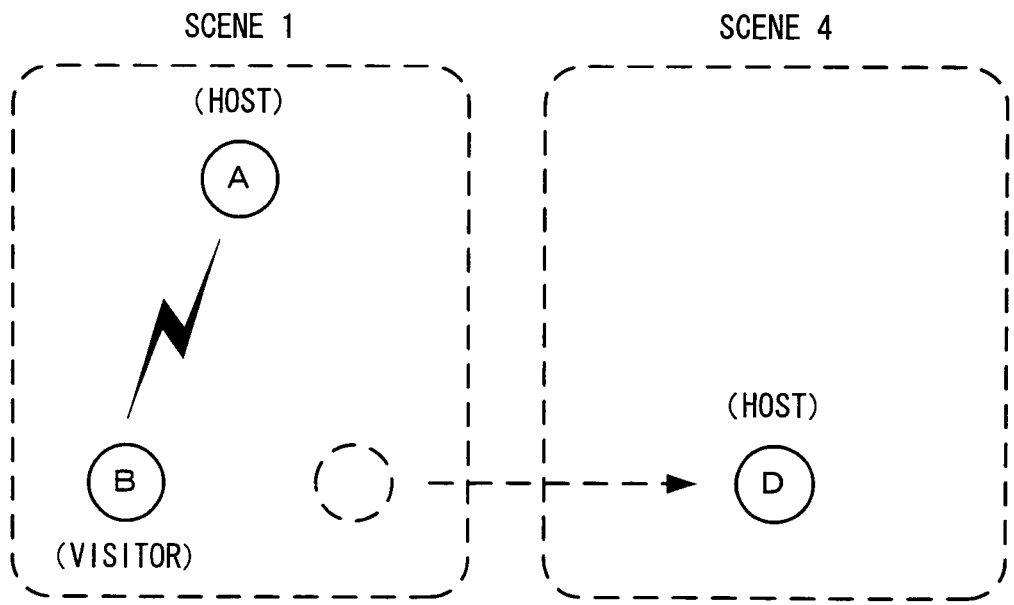

FIG. 6 is an illustrative view showing another example of a case that a scene visitor existing in a certain scene moves to another scene. More specifically, the example shows that the game apparatus D as a scene 1 visitor moves to the scene 4. FIG. 6(A) shows a state before the game apparatus D as a scene 1 visitor moves to the scene 4, and FIG. 6(B) shows a state after the game apparatus D moves to the scene 4. In this exemplary embodiment, in a case that another game apparatus 10 (scene host) does not exist in the scene after movement, the moved game apparatus 10 is set as a scene host. Accordingly, moving to the scene 4, the game apparatus D is set as a scene host.

It is noted that if a game apparatus 10 participates in a desired scene at a start of the communication game, in a case that no other game apparatuses participates in the desired scene, the game apparatus is set as a scene host.

Figure 7:
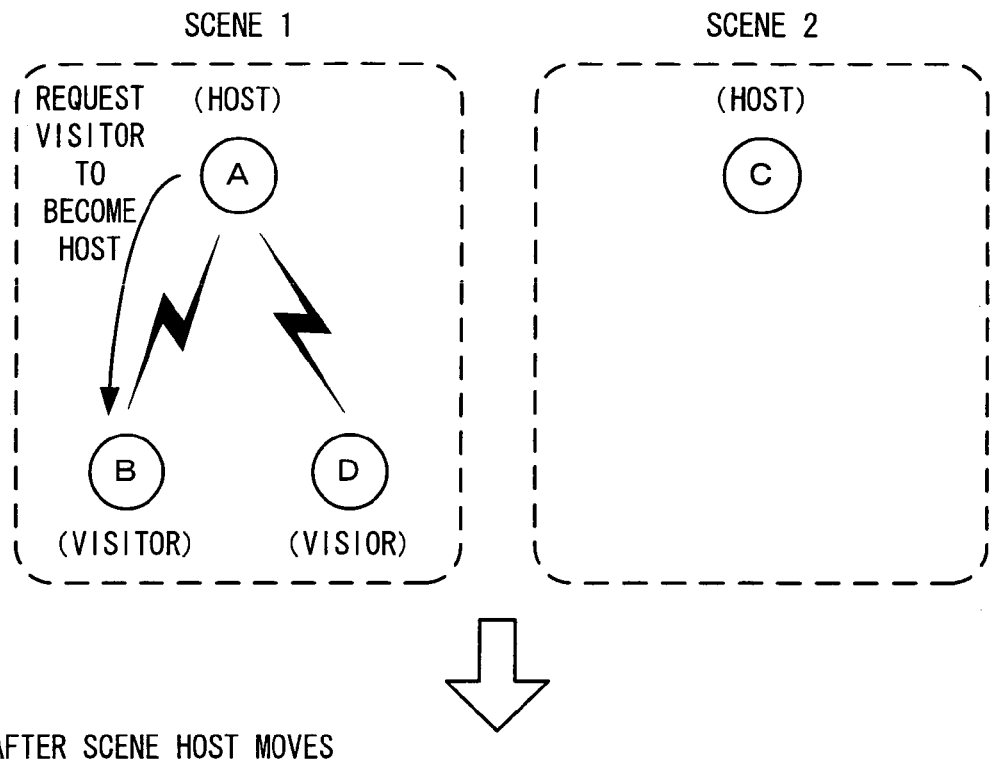
FIG. 7 is an illustrative view showing one example of a state in which a scene host moves to another scene in the communication game playable in the game system of FIG. 1 exemplary embodiment.
Figure 7:
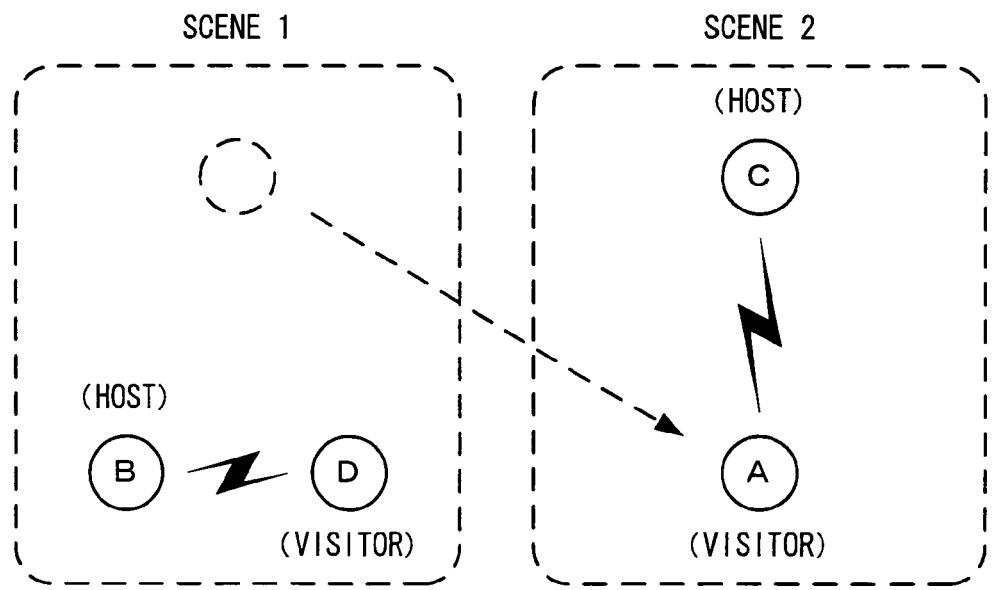

FIG. 7 is an illustrative view showing one example of a case that a scene host in a certain scene moves to another scene. More specifically, the example shows that the game apparatus A as a scene 1 host moves to the scene 2. FIG. 7(A) shows a state before the game apparatus A as a scene 1 host moves to the scene 2, and FIG. 7(B) shows a state after the game apparatus A moves to the scene 2. In such a case, unlikely to a case that the above-described scene visitor moves, a procedure (processing) of requesting another game apparatus 10 to become a scene host is needed in the scene before movement. This is because that if the scene host directly moves to another scene similarly to a case that the scene visitor moves, no scene host exists in the scene before movement, this prevents the game processing in the scene before movement from advancing. That is, a problem (inconvenience) occurs.

It is noted that when only the scene host exists in the scene before movement, the game processing thereafter is not hindered. Also, since no scene visitor exists, a procedure of requesting another game apparatus to be set as a scene host is not required.

As shown in FIG. 7(A) and FIG. 7(B), in a case that the scene 1 host, that is, the game apparatus A moves to the scene 2, the game apparatus A requests the game apparatus B as a scene 1 visitor to become the scene host before moving to the scene 2. That is, the game apparatus A requests the game apparatus B to change the setting to the scene host.

Here, as shown in an example in FIG. 7(A), the game apparatus B is requested to change the setting to the scene host out of the game apparatus B and the game apparatus D as a scene visitor. This is because that the scene visitor which is requested to become the scene host is selected according to a predetermined rule by utilizing a communication ID. In this exemplary embodiment, for the sake of clarity, each letter of the alphabet for identifying each of the game apparatuses 10 and the communication ID shall be the same with each other. The network parent device assigns a communication ID to each of the network child device. For example, the network parent device assigns the communication ID in an order of receiving a communication request (in alphabetical order). Accordingly, a network child device which first transmits a communication request to a network parent device is assigned with "A" as a communication ID. A network child device which next transmits a communication request to the network parent device is assigned with "B" as a communication ID. Then, a network child device which subsequently transmits a communication request to the network parent device is assigned with "C" as a communication ID. The same is true for a network child device which transmits a communication request to the network parent device subsequently or later.

In this exemplary embodiment, a scene host which tries to move from one scene to another scene requests a scene visitor with a communication ID low in number (descending number in alphabetical order) to become the scene host. Accordingly, as shown in FIG. 7(A), the game apparatus A requests the game apparatus B to change the setting to the scene host.

It is noted that it is not necessarily limited to a method in which a network child device having a communication ID of descending number in alphabetical order is selected as a scene host, the network child device may be selected at random. That is, the predetermined rule varies, and is to be designed by a programmer or a developer of the game.

Then, as shown in FIG. 7(B), the game apparatus B becomes a scene 1 host, and the game apparatus A moves to the scene 2. Since the movement of the game apparatus A to the scene 2 is the same as a case that the game apparatus D moves to the scene 2 as shown in FIG. 5(A) and FIG. 5(B), a duplicated description will be omitted.

Figure 8:
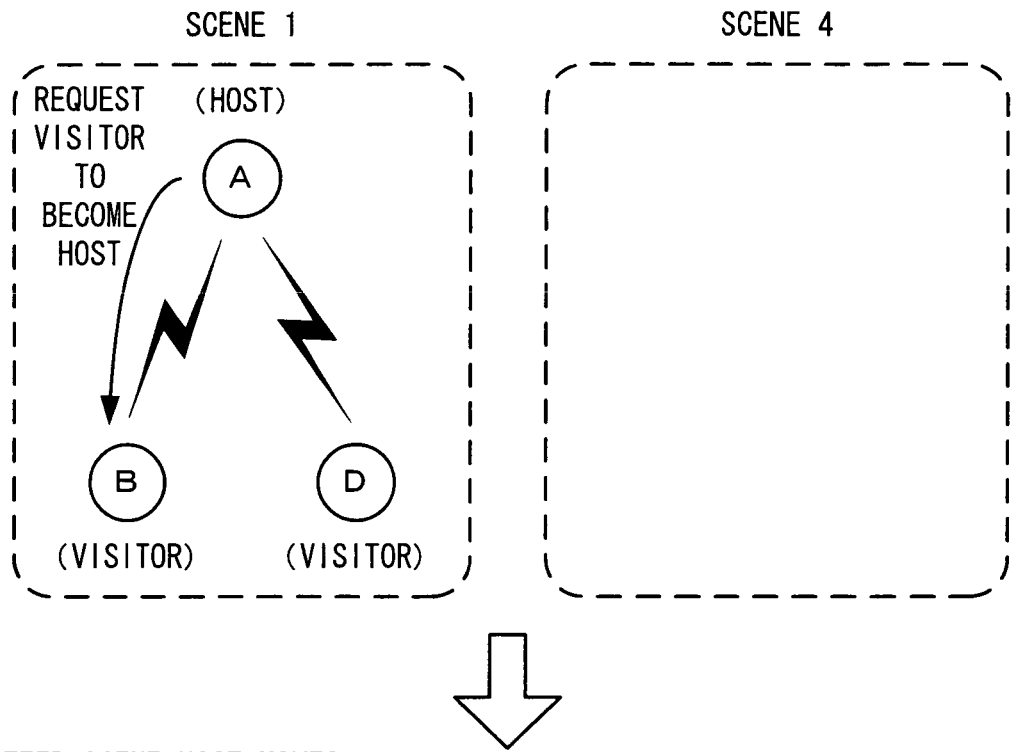
FIG. 8 is an illustrative view showing another example of a state in which the scene host moves to another scene in the communication game playable in the game system of FIG. 1 exemplary embodiment.
Figure 8:
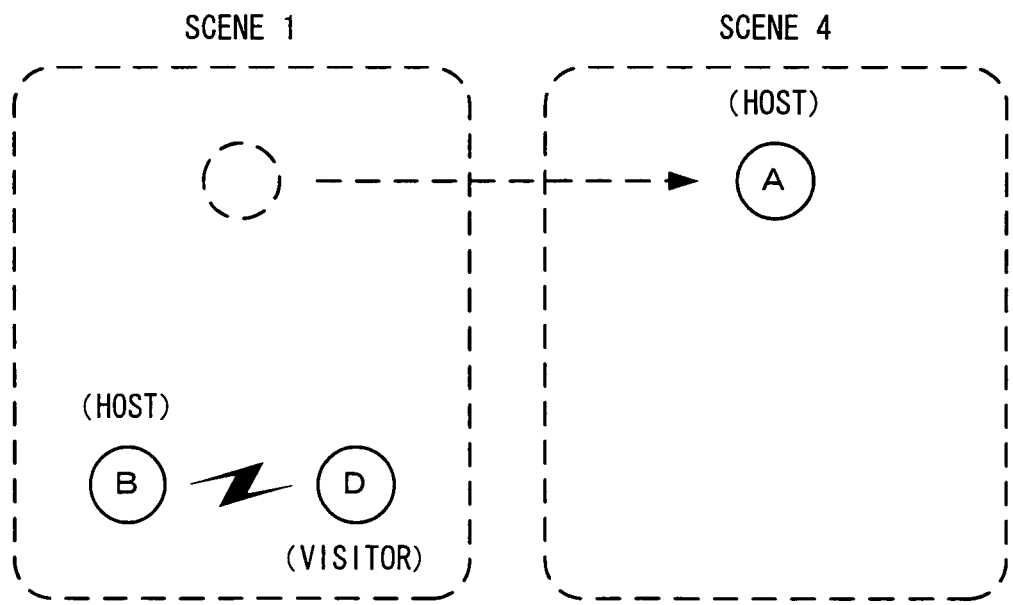

FIG. 8 is an illustrative view showing another example of a case that a scene host in a certain scene moves to another scene. More specifically, the example shows that the game apparatus A as a scene 1 host moves to the scene 4. FIG. 8(A) shows a state before the game apparatus A as a scene 1 host moves to the scene 4, and FIG. 8(B) shows a state after the game apparatus A moves to the scene 4. Since the example shown in FIG. 8 is the same as the FIG. 7 except that the game apparatus A is set as a scene host in the scene 4 after movement, a duplicated description will be omitted here. That is, similarly to a case with reference to FIG. 7, the game apparatus A requests the game apparatus B to change its setting to the scene host in the scene 1 before movement, and then moves to the scene 4. Furthermore, a case that the game apparatus A is set as a scene host in the scene 4 after movement is the same as the case described with referring to FIG. 6.

Thus, the game apparatus 10 freely moves in each of the scenes (within the virtual game space 200) to be set as a scene host and a scene visitor in each scene and to play its role, making it possible to execute a communication game.

FIG. 9-FIG. 13 is an illustrative view showing an updating process of the game data (game entire data) in the communication game. In FIG. 9-FIG. 13, for simplicity, a description will be made in a case that only the scene 1 and the scene 2 are included in the virtual space 200. In addition, in the scene 1, the game apparatus A and the game apparatus B participates, and the game apparatus A is a scene 1 host, and the game apparatus B is a scene 1 visitor. In the scene 2, the game apparatus C and the game apparatus D participate, and the game apparatus C is a scene 2 host, and the game apparatus D is a scene 2 visitor. In addition, in FIG. 9-FIG. 13, only the game entire data (scene shared data and scene specific data) stored in the RAM 48 to be integrated in each of the game apparatuses A-D is shown. It is noted that a content of the RAM 48 will be described in detail later, and thus omitted here.

Figure 9:
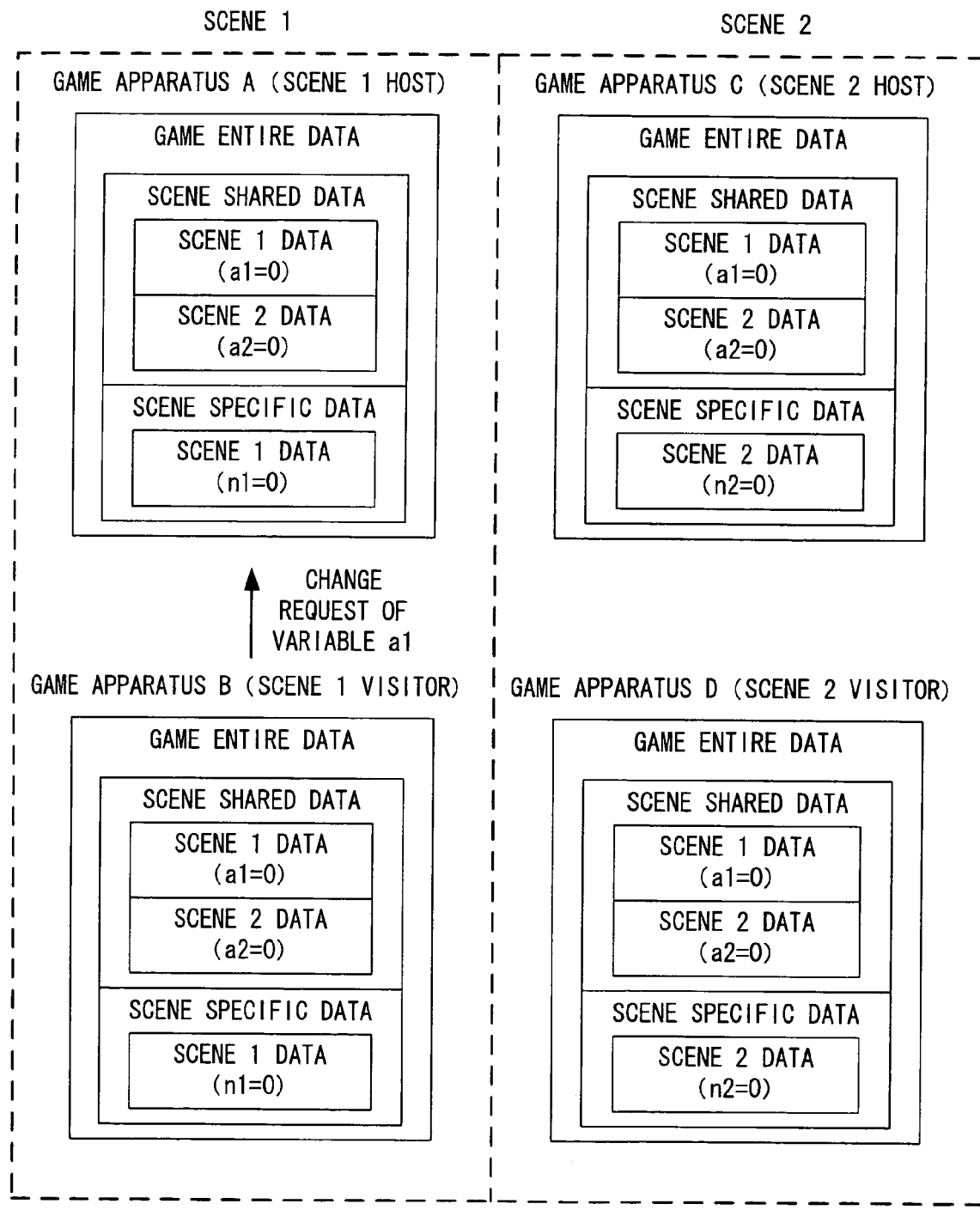
FIG. 9 is an illustrative view showing a state in which a scene visitor requests a scene host to change scene shared data in the communication game playable in the game system of FIG. 1 exemplary embodiment.

FIG. 9 shows a state in which the game apparatus B as a scene 1 visitor requests the game apparatus A as a scene 1 host to rewrite (change) game data (scene shared data) in the scene 1. Here, the game entire data includes scene shared data and scene specific data. The scene shared data is data to be shared with all the players (game apparatus 10) playing a virtual game (communication game) (participating in the communication game). Each game apparatus 10 stores in the memory (RAM 48) the scene shared data as to all the scenes irrespective of in which scene the player himself (user's own apparatus) participates in. The scene shared data is also stored when no game apparatus 10 participates in a certain scene. That is, this is data to be saved when the communication game is ended, and saved in RAM 28b of the memory card 28 (see FIG. 3) in this exemplary embodiment. Also, the scene specific data is data to be shared with only the players (game apparatus 10) in the same scene. Each game apparatus 10 stores in the RAM 48 the scene specific data as to the scene where the user's own apparatus currently participates in, and the scene specific data is abandoned if the user's own apparatus moves to another scene.

Accordingly, for example, in a street scene of the virtual game such as role playing game, information as to commodities displayed on a store is the scene shared data. That is, in a certain store, what kinds of commodities are displayed is a common state even if any players see them, and in a case that one buys a commodity, and any one of the others then visits sees the store, the commodity has to be absent. On the other hand, a state of a non player object such as an owner of a certain store (current position, operation, etc.) is scene specific data. That is, it is necessary to be commonly shown to the players who participate in the scene where the non player object exists, and what he is doing, but this is nothing to do with the players who participate in another scene. In addition, after no one exists in the scene, if anyone participates in the scene again, that is, if anyone visits the store, the scene specific data is initialized, and therefore, uncomfortable feeling is not provided even when non player object moves to another position.

Figure 10:
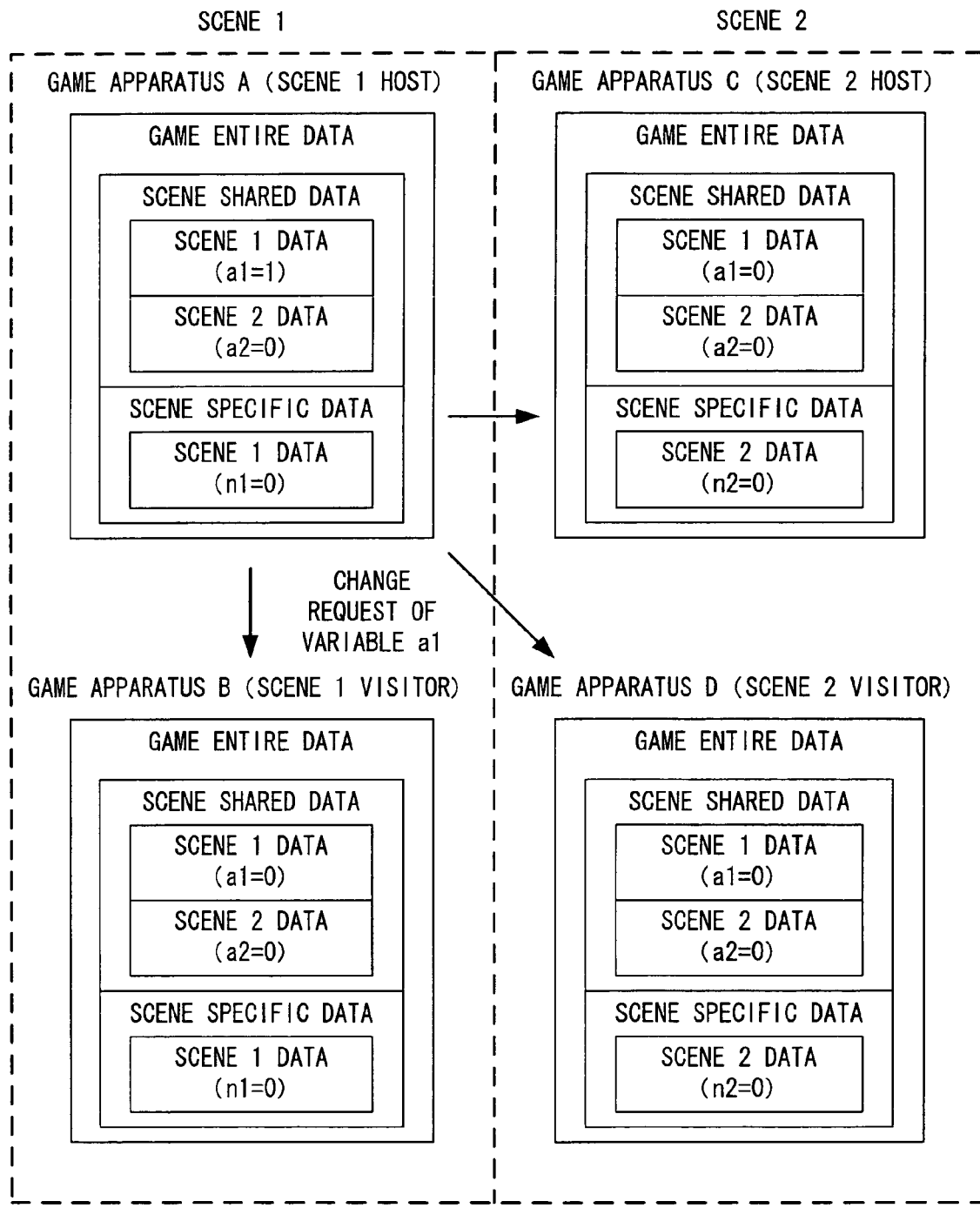
FIG. 10 is an illustrative view showing a state in which the scene host changes the scene shared data in response to the request from the scene visitor shown in FIG. 9, and then instructs all the game apparatuses to change the scene shared data in the communication game playable in the game system of FIG. 1 exemplary embodiment.
Figure 11:
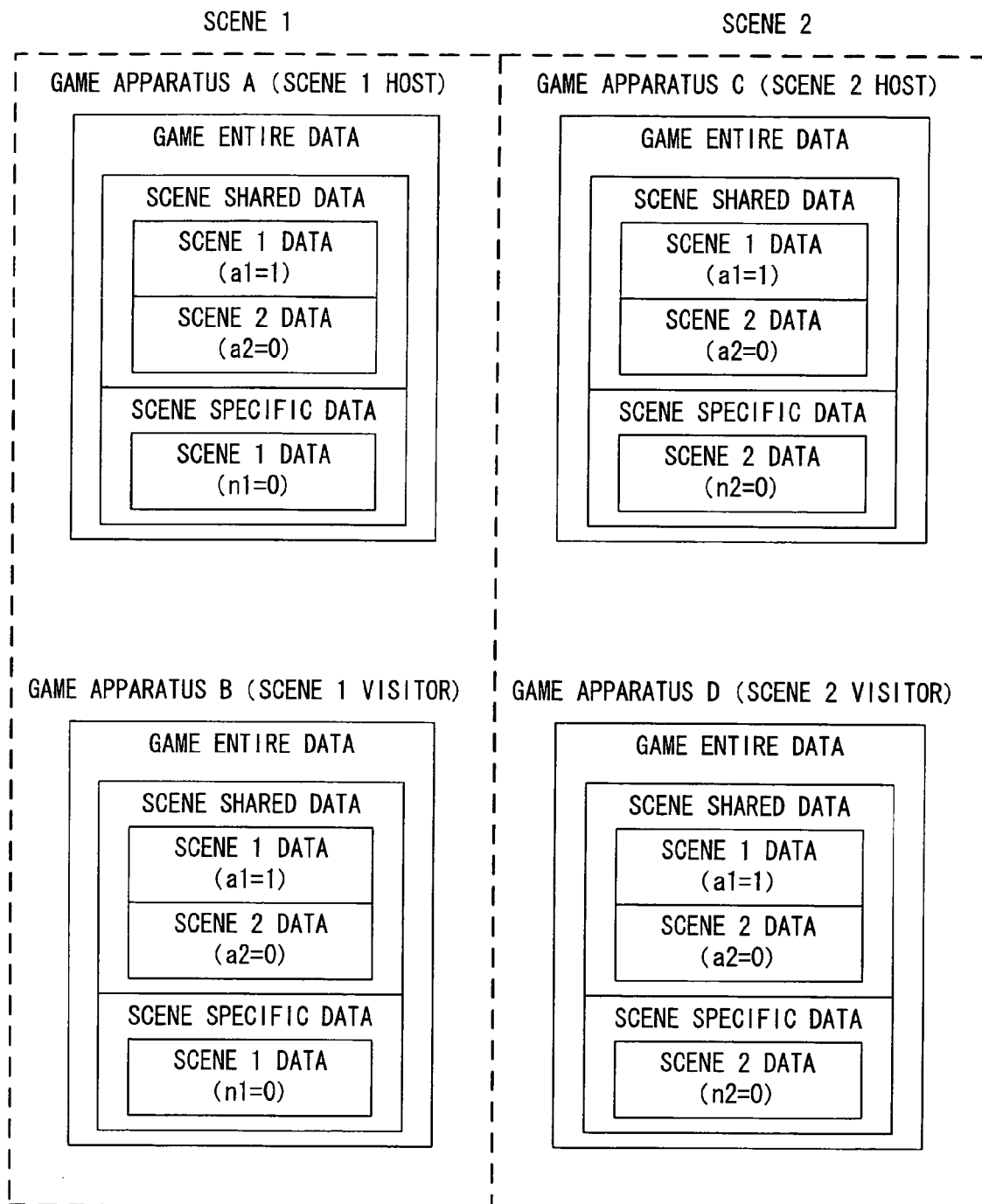
FIG. 11 is an illustrative view showing a state in which the scene shared data is changed as to all the game apparatuses in response to the instruction from the scene host shown in FIG. 10 in the communication game playable in the game system of FIG. 1 exemplary embodiment.

Returning to FIG. 9, when the game apparatus B requests the game apparatus A to change the scene 1 data (variable a1) included in the scene shared data, the game apparatus A rewrites an variable a1 stored in the RAM 48 of the user's own apparatus in response thereto as shown in FIG. 10. Here, the value of the variable a1 is rewritten from "0" to "1". That is, the scene shared data is updated. Then, the game apparatus A instructs the rest of all the game apparatuses, that is, the game apparatus B, the game apparatus C, and the game apparatus D to update the variable a1. This is because that the scene shared data needs to be shared with all the game apparatuses 10 participating in the communication game. Accordingly, as shown in FIG. 11, also, in the game apparatus B, the game apparatus C, and the game apparatus D, the variable a1 is rewritten, that is, the scene shared data is updated.

It is noted that, although illustration is omitted, if the scene host updates the scene shared data, update of the scene shared data is merely instructed to the rest of the game apparatuses 10.

Figure 12:
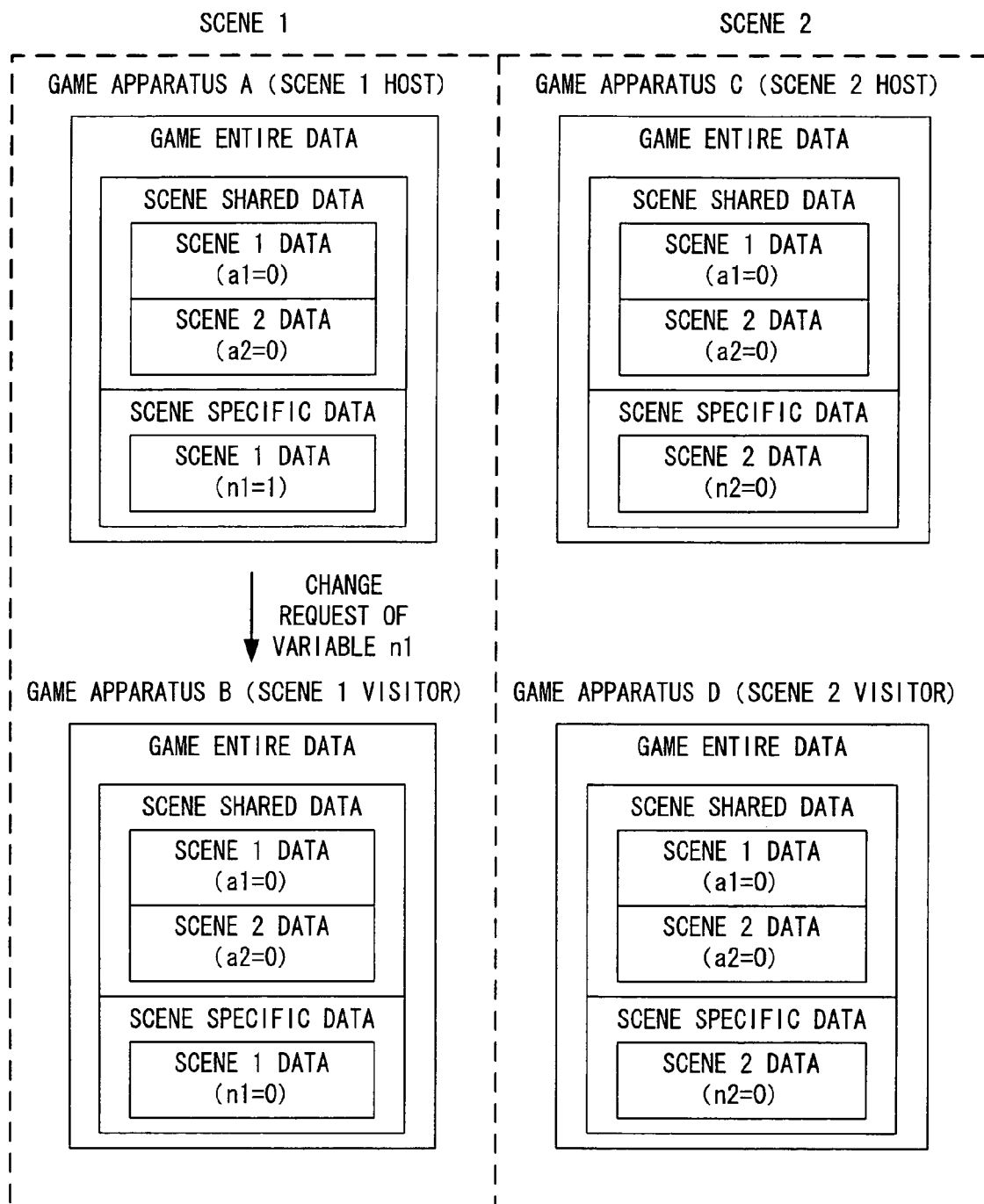
FIG. 12 is an illustrative view showing a state in which the scene host instructs a scene visitor to change scene specific data in the communication game playable in the game system of FIG. 1 exemplary embodiment.
Figure 13:
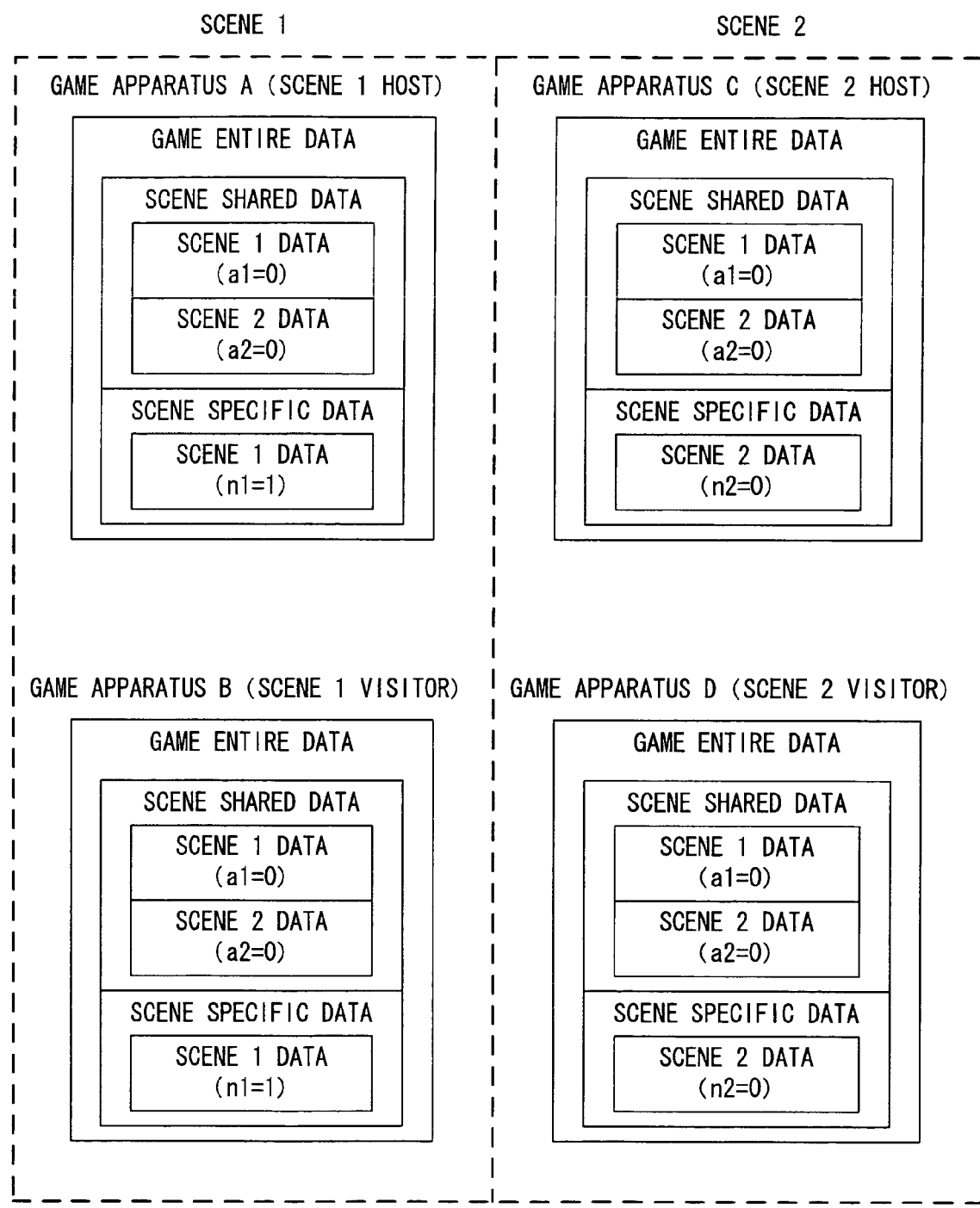
FIG. 13 is an illustrative view showing a state in which the scene specific data of the scene visitor is changed in response to an instruction from the scene host shown in FIG. 12 in the communication game playable in the game system of FIG. 1 exemplary embodiment.

Additionally, FIG. 12 is an illustrative view showing a state in which a scene host instructs a scene visitor to update the scene specific data. More specifically, the example shows that in the scene 1, the game apparatus A as a scene 1 host instructs the game apparatus B as a scene 1 visitor to update the scene 1 data (variable n1). It is noted that when updating the scene specific data stored in the RAM 48, the game apparatus A instructs the game apparatus B to update the scene specific data. In response thereto, as shown in FIG. 13, the game apparatus B updates the variable n1 stored in the RAM 48. Here, the value of the variable n1 is rewritten from "0" to "1". That is, the scene specific data is updated.

It is noted that the scene specific data is determined (generated and updated) by the scene host in the scene at random (random number), and therefore, the scene visitor never requests the scene host to update the scene specific data. As described above, the scene specific data has nothing to do with the game apparatus 10 participating in another scene, and therefore, the game apparatus 10 participating in another scene is never instructed to update it.

Thus, in a communication game, an updating process of the game entire data is executed by a scene host existing in each scene. That is, in a conventional game system, a process executed by only the network parent device is shared with the respective scene hosts. It is noted that the scene where no game apparatus 10 participates in has no scene host.

It is noted that if the network parent device participates in the scene as a scene host, it naturally needs to share an updating process of the game entire data.

Figure 14:
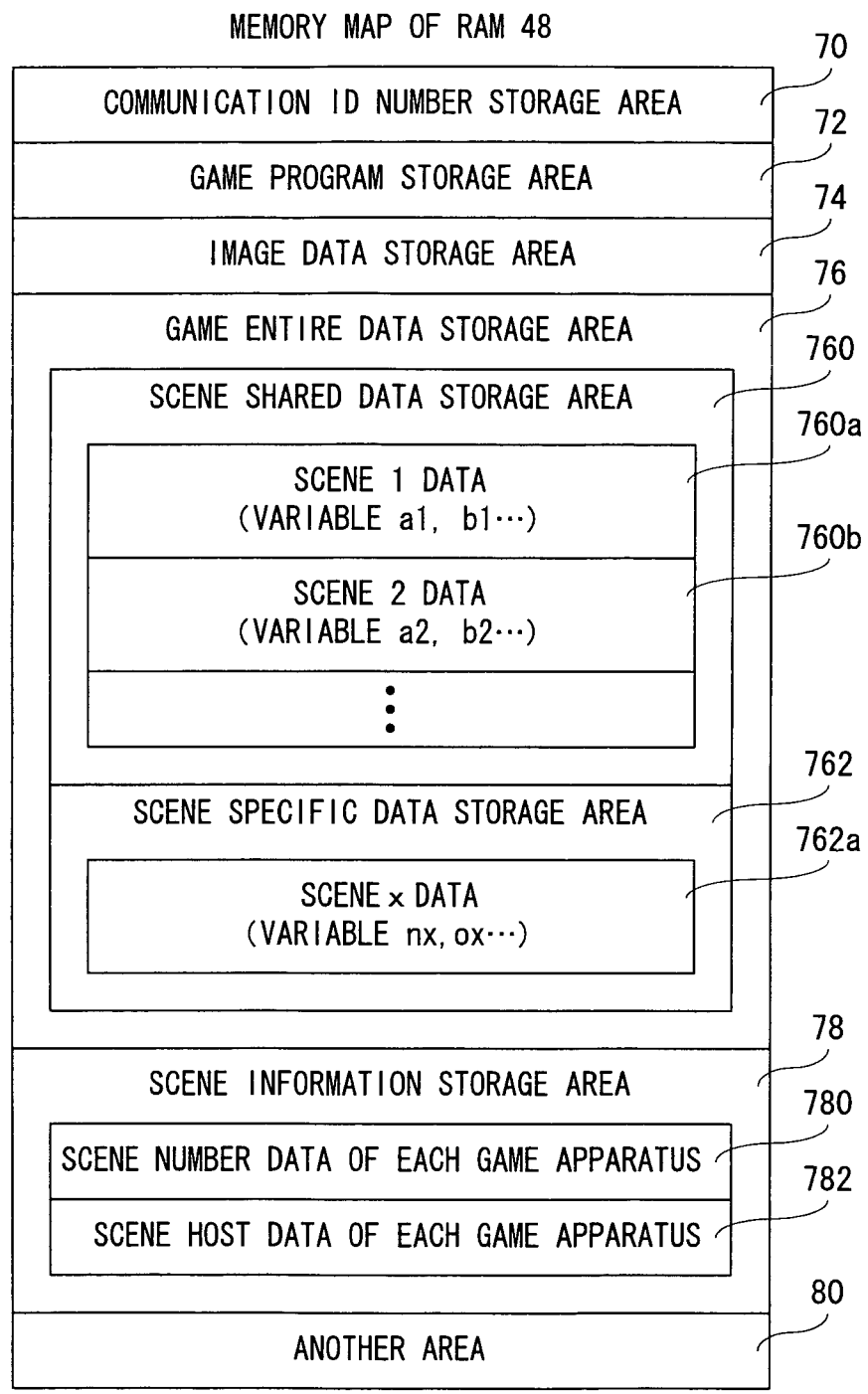
FIG. 14 is an illustrative view showing a memory map of a RAM shown in FIG. 3.

FIG. 14 is an illustrative view showing one example of a memory map of the Ram 48 integrated in the game apparatus 10. As shown in FIG. 14, the RAM 48 includes a communication ID storage area 70, a game program storage area 72, an image data storage area 74, a game entire data storage area 76, a scene information storage area 78, and another area 80.

The communication ID storage area 70 is an area for storing a communication ID assigned to each of the game apparatuses 10. Accordingly, the communication ID storage area 70 is rewritten every time that a communication game is performed. It is noted that as described above, the network parent device assigns the communication ID to the network child device, and therefore, the network parent device is not assigned with the communication ID. Thus, a game apparatus 10 which participates in the communication game and to which the communication ID is not described can be identified as a network parent device.

It is noted that as described above, if the scene host moves to another scene, the scene visitor existing in the scene before movement is requested to become a scene host. It is noted that if a plurality of scene visitors exist there, a scene visitor which is requested to become the scene host is determined on the basis of the communication ID. Since the network parent device is not assigned with the communication ID, in a case a plurality of scene visitors including the network parent device exist, the network parent device not having the communication ID is neglected in order to reduce processing load of the network parent device. It is noted that in a case that only the network parent device exists in the scene before movement of the scene host, the network parent device is requested to become a scene host, and so forth.

The game program storage area 72 stores a game program for executing an arbitrary game (communication game in this exemplary embodiment, and so forth). Here, the game program comprises a game entire processing program, an image display program, a sound (music) reproducing program, a backup program, etc. It is noted that a communication game is to be executed in this exemplary embodiment, so that the game program also includes a communication program. The image data storage area 74 stores image data (polygon data, texture data, etc.) for rendering (generating and displaying) a player object appearing in an arbitrary game, an non-player object such as an enemy object, etc., an item object, a background object.

The game entire data storage area 76 comprises a scene shared data storage area 760 and a scene specific data storage area 762. In the scene shared data storage area 760, the scene shared data, that is, scene 1 data 760a (variable a1, b1, . . . ), scene 2 data 760b (variable a2, b2, . . . ), . . . are stored. In addition, in the scene specific data storage area 762, the scene specific data as to a current scene, that is, scene x data 762a (variable nx, ox, . . . ) is stored. It is noted that in this exemplary embodiment, the variable x is an integer between 1 and 4, and indicates a scene number of the scene where a game apparatus currently participates in. Thus, the scene specific data need not store specific data at to all the scenes, and merely stores the specific data of the scene where the user's own apparatus participates in, and therefore, it is possible to save available space or usage of the memory (RAM 48).

The scene information storage area 78 is an area for storing scene information. More specifically, scene number data 780 as to each game apparatus 10 and scene host data 782 as to each game apparatus 10 are stored. The scene number data 780 is data indicating a scene number (identification information) of a scene where each of the game apparatuses currently participates corresponding to each of the game apparatuses 10. The scene host data 782 is data (flag) for indicating whether or not each game apparatus 10 is set as a scene host or as a scene visitor. For example, the scene host data 782 comprises a register having the number of bits the same as or equal to or more than the number of the game apparatuses 10 participating in the communication game, and each of the bits corresponds to each of the game apparatuses 10. Then, in a case that the game apparatus 10 is set as a scene host, the flag (hereinafter referred to as "scene host flag") is turned on, and a data value "1" is set to a corresponding bit. On the other hand, in a case that the game apparatus 10 is set as a scene visitor, the scene host flag is turned off, and a data value "0" is set to a corresponding bit.

The another area 80 is utilized as a working area of the CPU core 42 or another storage area. For example, a sound (music) for outputting sound (music) required for the game is stored.

Figure 15:
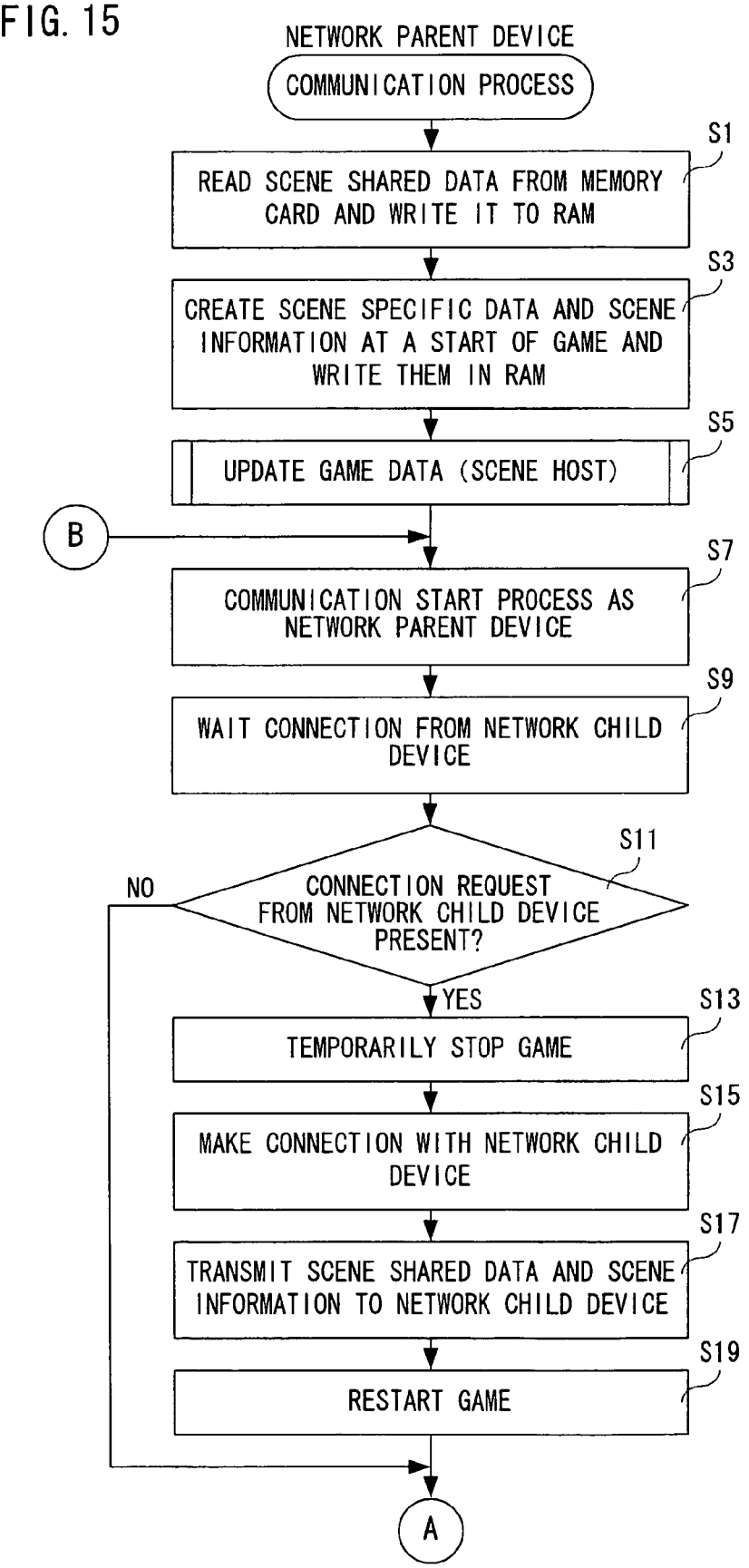
FIG. 15 is a flowchart showing a part of a communication process of a network parent device.
Figure 16:
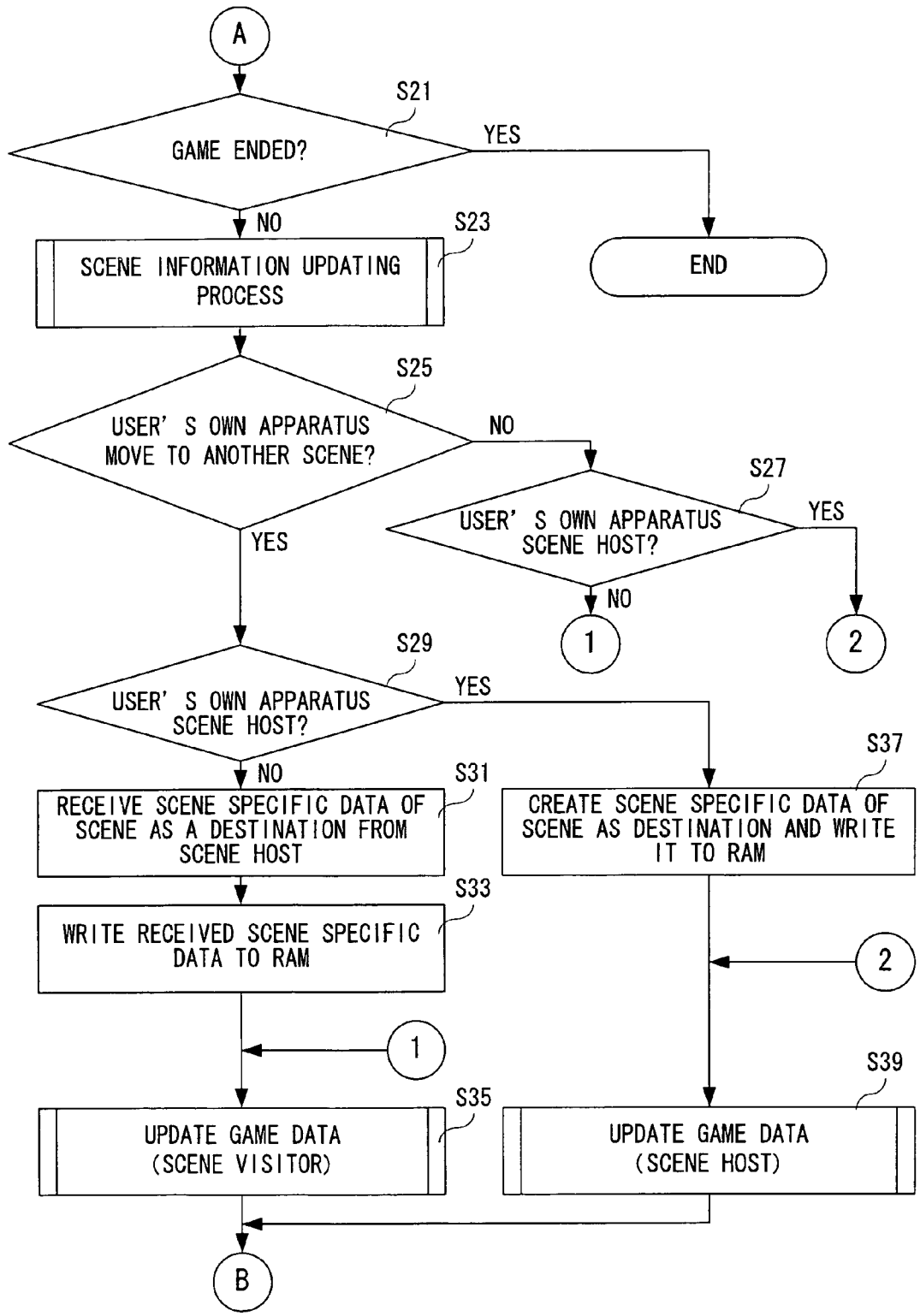
FIG. 16 is a flowchart showing another part of the communication process of the network parent device, and continuing from FIG. 15.

More specifically, the CPU core 42 of the game apparatus processes following flowcharts shown below to allow a game apparatus to participate in a communication game, move to another scene, update the game entire data, etc. FIG. 15 and FIG. 16 are flowcharts showing a communication process if the game apparatus 10 (user's own apparatus) is a network parent device. It is noted that whether or not the user's own apparatus is a network parent device can be determined depending on whether or not the communication ID is assigned to it. This is true for the following.

As shown in FIG. 15, when starting a communication process for a network parent device, the CPU core 42 reads the scene shared data from the memory card 28, and writes it to the RAM 48 in a step S1. In a succeeding step S3, the scene specific data and the scene information of the scene at a start of the game are created and written to the RAM 48. Here, creation of the scene specific data specifically means that CPU core 42 sets at random a value of each variable (or flag) included in the scene specific data. In addition, the CPU core 42 describes the scene number at a start of the game as scene number data 780 corresponding to the identification information of the user's own apparatus, and sets a data value "1" in a bit corresponding to the user's own apparatus as a scene host data 782. That is, the scene host flag of the user's own apparatus is turned on.

In a next step S5, a game data updating process (see FIG. 19 and see FIG. 20) for a scene host is executed as described later, and in a step S7, a communication start process as a network parent device is executed. In a succeeding step S9, a connection from a network child device (another game apparatus 10) is waited, and in a step S11, it is determined whether or not a connection request from a network child device (another game apparatus 10) is presented. If "NO" in the step S11, that is, if there is no connection request from the network child device, the process directly proceeds to a step S21 shown in FIG. 16. On the other hand, if "YES" in the step S11, that is, if there is a connection request from the network child device, the communication game is temporarily stopped in a step S13.

In this exemplary embodiment, for the sake of simplicity, a description is made on only the updating process of the game data in a communication game (see FIG. 19-FIG. 22). Strictly speaking, the CPU core 42 executes a game process of the communication game in parallel with the communication game. Accordingly, in the step S13, the communication game is temporarily stopped.

It is noted that, as simply described, in the communication game process, an animation process causing a game object to make an arbitrary action according to an instruction by the player, an image processing for representing its manner or displaying a game world, or a reproduction process of a sound required for the game are executed.

In a next step S15, a connection is established with the network child device. Here, the exemplary embodiment is a wireless communication game system in which the parent device and the child device advances the game while making a wireless communication by a weak radio wave, and therefore, the term "connection" should not be used primarily. However, for the sake of convenience, as a term representing an associated state between the hand-held game apparatus as a parent device and the hand-held game apparatus as a child device, "connection" may be used by utilizing the wire communication terms.

It is noted that one example of such a connection process (the same is true for a connection process as a network child device to be described later) is disclosed in detail in a Japanese Patent Laying-open No.2004-135778 filed earlier by the applicant of the present invention and already published, and such a connection process is not an critical content about the present invention, and therefore, the description is omitted here.

In a succeeding step S17, scene shared data and scene information are transmitted to the connected network child device, and in a step S19, the communication game is restarted, and then, the process proceeds to the step S21. As shown in FIG. 16, in the step S21, it is determined whether the game end or not. More specifically, it is determined whether or not there is an instruction from a game end from a player, or the game is over. If "YES" in the step S21, that is, if the game is ended, a communication process for the network parent device is directly ended.

It is noted that in this exemplary embodiment, when the network parent device ends the communication game, the communication game is ended (forcedly terminated) also in the network child device.

However, if "NO" in the step S21, that is, if the game is not ended, a scene information updating process (see FIG. 23) described later is executed in a step S23. In a following step S25, it is determined whether or not a user's own apparatus moves to another scene. Here, with referring to the scene number data 780 included in the scene information, it is determined whether or not the scene number as to the user's own apparatus is updated. If "NO" in the step S25, that is, if the user's own apparatus does not move to another scene, it is determined whether or not the user's own apparatus is a scene host in a step S27. Here, with reference to the scene host data 782, it is determined whether or not the scene host flag of the user's own apparatus is turned on. If "NO" in the step S27, that is, if the user's own apparatus is a scene visitor, the process directly proceeds to a step S35. On the other hand, if "YES" in the step S27, that is, if the user's own apparatus is a scene host, the process directly proceeds to a step S39.

Additionally, if "YES" in the step S25, that is, if the user's own apparatus moves to another scene, it is determined whether or not the user's own apparatus is a scene host in a step S29. The determination method is the same as that in the step S27. If "NO" in the step S29, that is, if the user's own apparatus is a scene visitor, scene specific data of the scene as a destination is received from the scene host in a step S31, and the received scene specific data is written to the RAM 48 in a step S33. Then, in the step S35, a game data updating process (FIG. 21 and FIG. 22) for a scene visitor is executed as described later, and the process returns to the step S7 shown in FIG. 15.

However, if "YES" in the step S29, that is, if the user's own apparatus is a scene host, the scene specific data of the scene as a destination is created, and written to the RAM 48 in a step S37. Then, in a step S39, a game data updating process for a scene host is executed as described later, and the process returns to the step S7.

Figure 17:
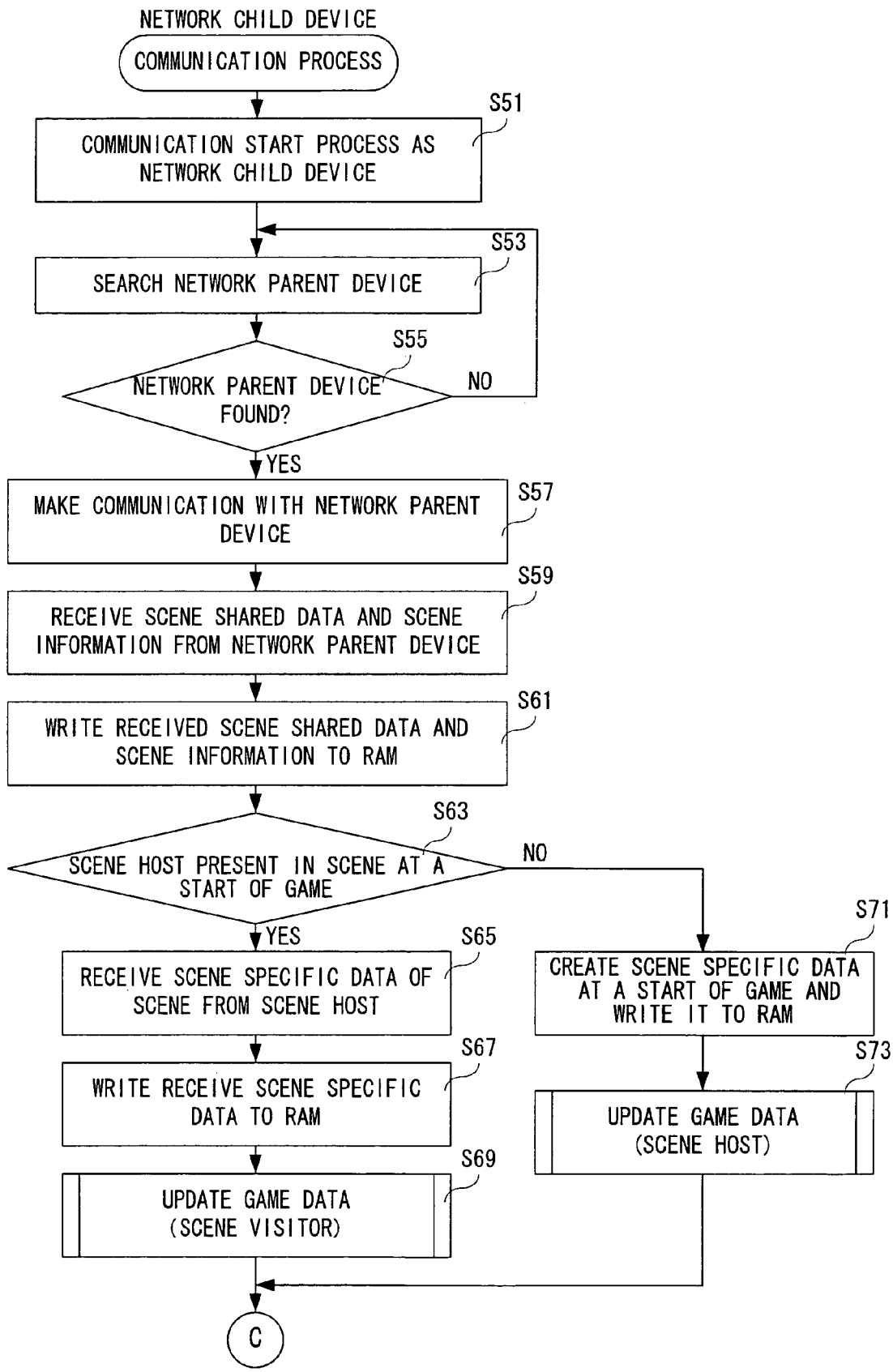
FIG. 17 is a flowchart showing a part of a communication process of a network child device.
Figure 18:
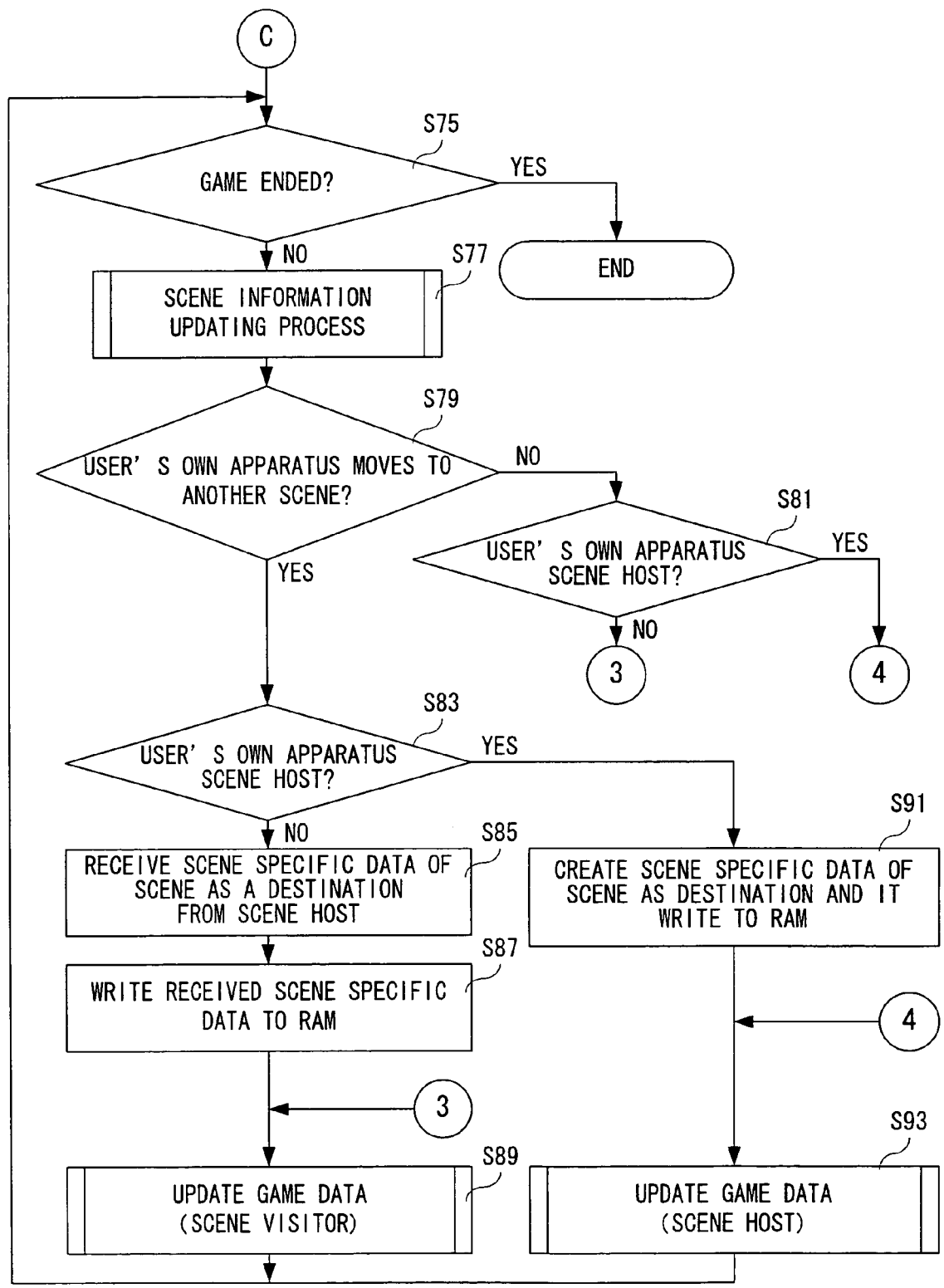
FIG. 18 is a flowchart showing another part of the communication process of the network child device, and continuing from FIG. 17.

FIG. 17 and FIG. 18 is a flowchart showing a communication process in a case that the game apparatus 10 (user's own apparatus) is a network child device. As shown in FIG. 17, when starting a communication process for the network child device, the CPU core 42 executes a communication start process as a child device in step S51. In a next step S53, a network parent device is searched, and in a step S55, it is determined whether or not a network parent device is found. If "NO" in the step S55, that is, if a network parent device is not found, the process directly returns to the step S53 to continue to search a network parent device. On the other hand, if "YES" in the step S55, that is, if a network parent device is found, a connection is established with the network parent device in a step S57.

It is noted that as described above, such a communication process is disclosed in a Japanese Patent Laying-open No. 2004-135778.

In addition, in this exemplary embodiment, if a network parent device is not found in the step S55, the process returns to the step S53 to continue to search the network parent device. However, in order to reduce wasteful consumption of a battery, if a search time of the network parent device exceeds a predetermined time period, a fact that the network parent device is not found is informed, and then, the communication process may be ended or a communication process (FIG. 15 and FIG. 16) as a network parent device may be started.

As described above, when a connection is established with the network parent device, the scene shared data and the scene information are received from the network parent device in a step S59, and the received scene shared data and scene information are written to the RAM 48 in a step S61. Succeedingly, in a step S63, it is determined whether or not a scene host exists in the scene at a start of the game. Here, with reference to the scene number data 780 included in the scene information, it is determined whether or not another game apparatus 10 participates in the scene where the user's own apparatus participates in.

If "YES" in the step S63, that is, if the scene host exists in the scene at a start of the game, the scene specific data of the scene is received from the scene host in order to participate in the scene as a scene visitor in a step S65, and the received scene specific data is written to the RAM 48 in a step S67. Then, in a step S69, a game data updating process for a scene visitor is executed as described later, and then, the process proceeds to a step S75 as shown in FIG. 18.

On the other hand, if "NO" in the step S63, that is, if the scene host does not exist in the scene at a start of the game, the scene specific data of the scene at a start of the game is created in order to participate in the scene as a scene host, and written to the RAM 48 in a step S71. Then, in the step S73, as described later, a game processing is executed as a scene host, and then, the process proceeds to a step S75.

Although illustration is omitted, when the user's own apparatus participates in the scene as a scene host or a scene visitor, the contents of the user's own apparatus is added to the scene information, that is, the scene number data 780 and the scene host data 782. Specifically, the number of the scene where the user's own apparatus participates in and the data described in corresponding to the identification information of the user's own apparatus are added to the scene number data 780. Additionally, in a case of participating in as a scene host, the scene host flag as to the user's own apparatus is turned on.

As shown in FIG. 18, in the step S75, it is determined whether a game end or not. Here, it is determined whether or not an instruction of a game end is applied from the player, whether or not the game is over, or whether or not the network parent device ends the communication game. If "YES" in the step S75, that is, if it is determined to be a game end, the communication process for the network child device is directly ended. On the other hand, if "NO" in the step S75, that is, if it is not the game over, a scene information updating process described later is executed in a step S77, and it is determined whether or not the user's own apparatus moves to another scene in a step S79. The determination method is similar to that of the above-described step S25.

If "NO" in the step S79, that is, if the user's own apparatus does not move to another scene, it is determined whether or not the user's own apparatus is a scene host in a step S81. If "NO" in the step S81, that is, if the user's own apparatus is a scene visitor, the process directly proceeds to a step S89. However, if "YES" in the step S81, that is, if the user's own apparatus is a scene host, the process directly proceeds to a step S93.

On the other hand, if "YES" in the step S79, that is, if the user's own apparatus moves to another scene, it is determined whether or not the user's own apparatus is a scene host in a step S83. The determination method is the same as that of the above-described step S25. If "NO" in the step S83, that is, if the user's own apparatus is a scene visitor, the scene specific data of the scene as the destination is received from the scene host in a step S85, and the received scene specific data is written to the RAM 48 in a step S87. Then, in a step S89, a game data updating process for a scene visitor is executed as described later, and then the process returns to the step S75.

In addition, if "YES" in the step S83, that is, if the user's own apparatus is a scene host, the scene specific data of the scene as the destination is created, and written to the RAM 48 in a step S91. Then, in a step S93, a game data updating process for a scene host as described later is executed, and then, the process returns to the step S75.

Figure 19:
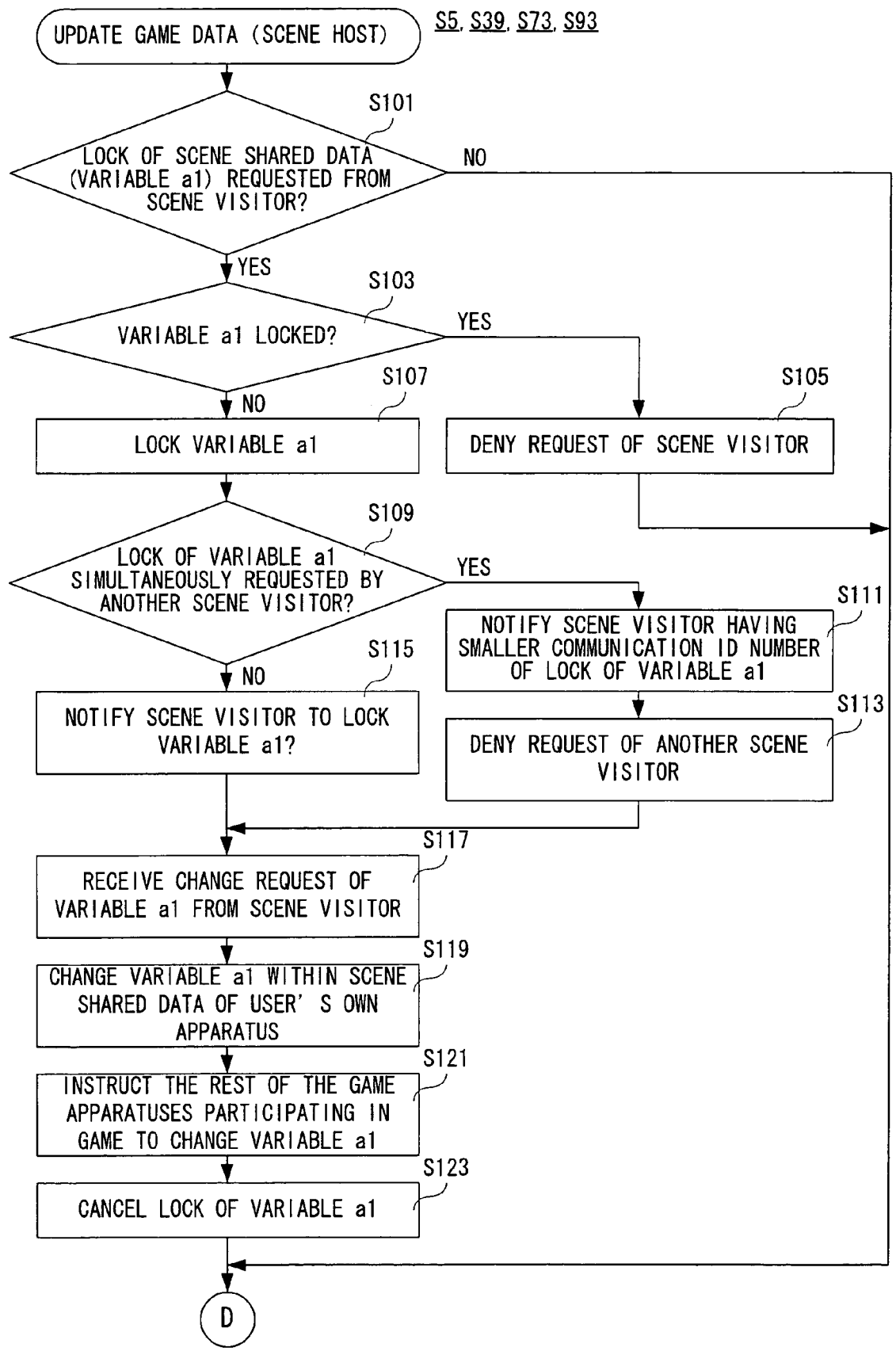
FIG. 19 is a flowchart showing a part of a game data updating process for a scene host.
Figure 20:
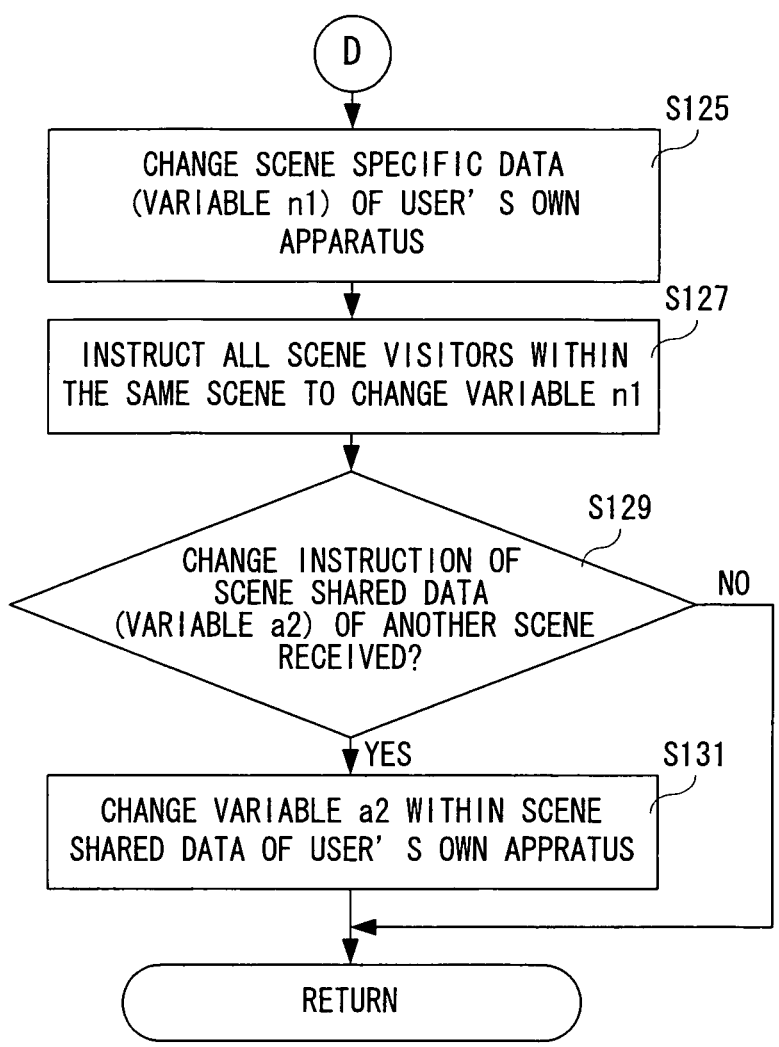
FIG. 20 is a flowchart showing another part of the game data updating process for a scene host, and continuing from FIG. 19.

FIG. 19 and FIG. 20 are a game data updating process for a scene host (the above-described step S5, S39, S73, S93). The game data updating process is executed in a case that the user's own apparatus is a parent device (scene host) in a scene irrespective of whether it is the network parent device or the network child device. As shown in FIG. 19, when starting the game data updating process for a scene host, the CPU core 42 determines whether or not there is a request by the scene visitor to lock the scene shared data (referred to as "variable a1" here for the sake of description) in a step S101.

If "NO" in the step S101, that is, if there is no request of lock of the variable a1, the process directly proceeds to a step S125 shown in FIG. 20. However, if "YES" in the step S101, that is, if the variable a1 is requested to be locked, it is determined whether or not the variable a1 is locked in a step S103. That is, it is determined whether or not the variable a1 has already been locked by a scene visitor different from the scene visitor from which the lock of the variable a1 is requested.

If "YES" in the step S103, that is, if the variable a1 is locked, the request from the scene visitor from which the lock of the variable a1 is currently requested is denied in a step S105, and then, the process proceeds to the step S125. That is, in the step S105, a request denial is notified to the scene visitor which currently requests to lock the variable a1. On the other hand, if "NO" in the step 103, that is, if the variable a1 is not locked, the variable a1 is locked in step S107, and it is determined whether or not another scene visitor simultaneously requests to lock the variable a1 in a step S109.

If "YES" in the step S109, that is, if another scene visitor simultaneously requests to lock the variable a1, a scene visitor having a lower communication ID in number is notified that the variable a1 is locked in a step S111, and the other scene visitors are notified that the request is denied in a step S113, and then, the process proceeds to a step S117. On the other hand, If "NO" in the step S109, that is, if another scene visitor does not simultaneously request to lock the variable a1, the scene visitor is notified that the variable a1 is locked in a step S115, and then, the process proceeds to the step S117.

In the step S117, a change request of the variable a1 is received from the scene visitor. It is noted that the scene visitor is the scene visitor which notifies that the variable a1 is locked. In a succeeding step S119, the variable a1 within the scene shared data of the user's own apparatus is changed, and in a step S121, the rest of all the game apparatuses 10 participating in the game are instructed to changed the variable a1. Then, in a step S123, the lock of the variable a1 is canceled, and then, the process proceeds to the step S125.

In the step S125 shown in FIG. 20, the scene specific data (referred to as "variable n1" for the sake of convenience of description) of the user's own apparatus is changed. In a succeeding step S127, all the scene visitors within the same scene are instructed to change the variable n1. Then, in a step S129, it is determined whether or not a change instruction of the scene shared data (here, for the sake of convenience of description, referred to as "variable a2") is received from a scene host of another scene. If "NO" in the step S129, that is, if the change instruction of the variable a2 is not received, the game data updating process for a scene host is directly returned. However, if "YES" in the step S129, that is, if the change instruction of the variable a2 is received, the variable a2 is changed in a step S131, and then, the game data updating process for a scene host is returned.

Figure 21:
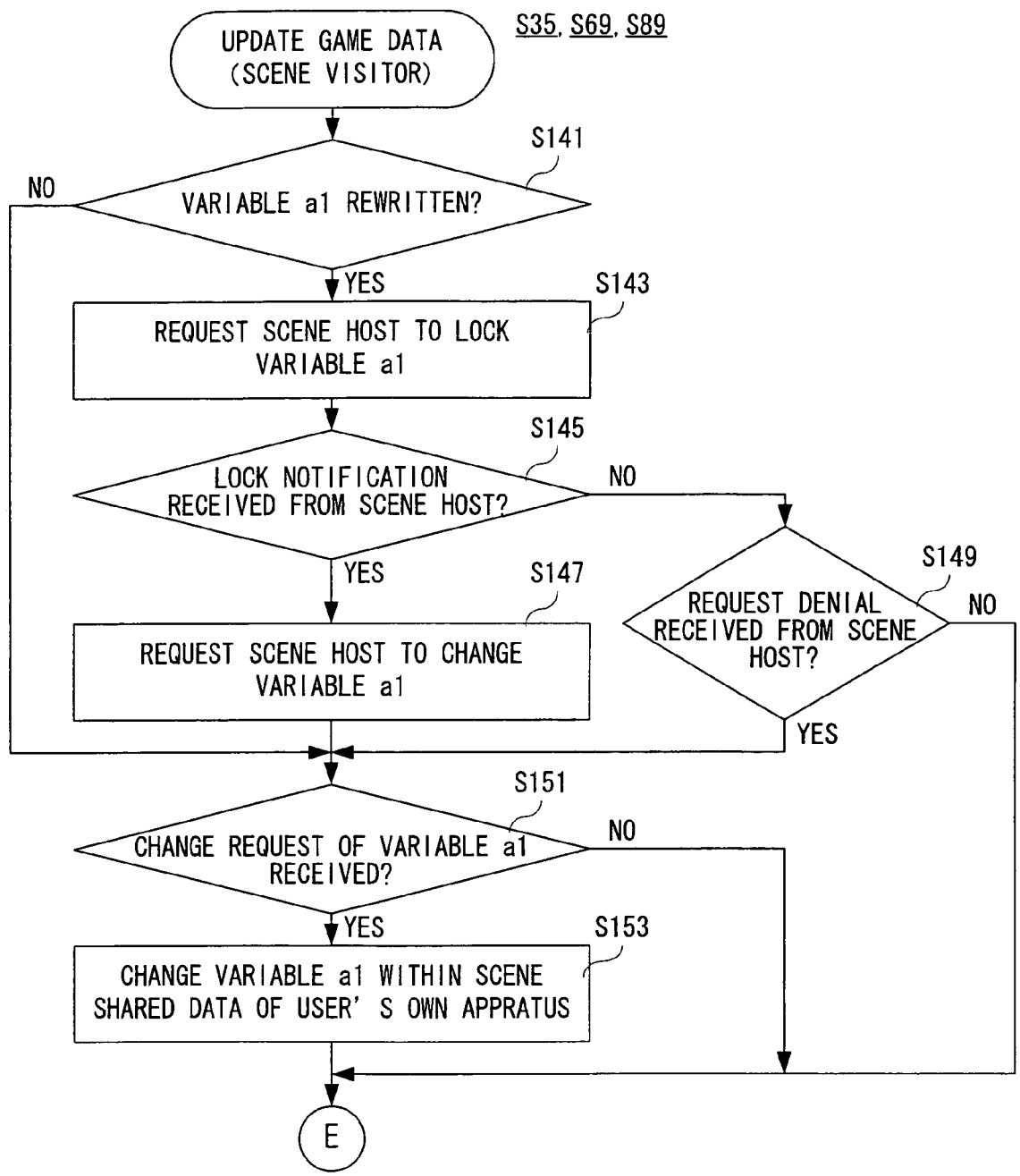
FIG. 21 is a flowchart showing a part of a game data updating process for a scene visitor.
Figure 22:
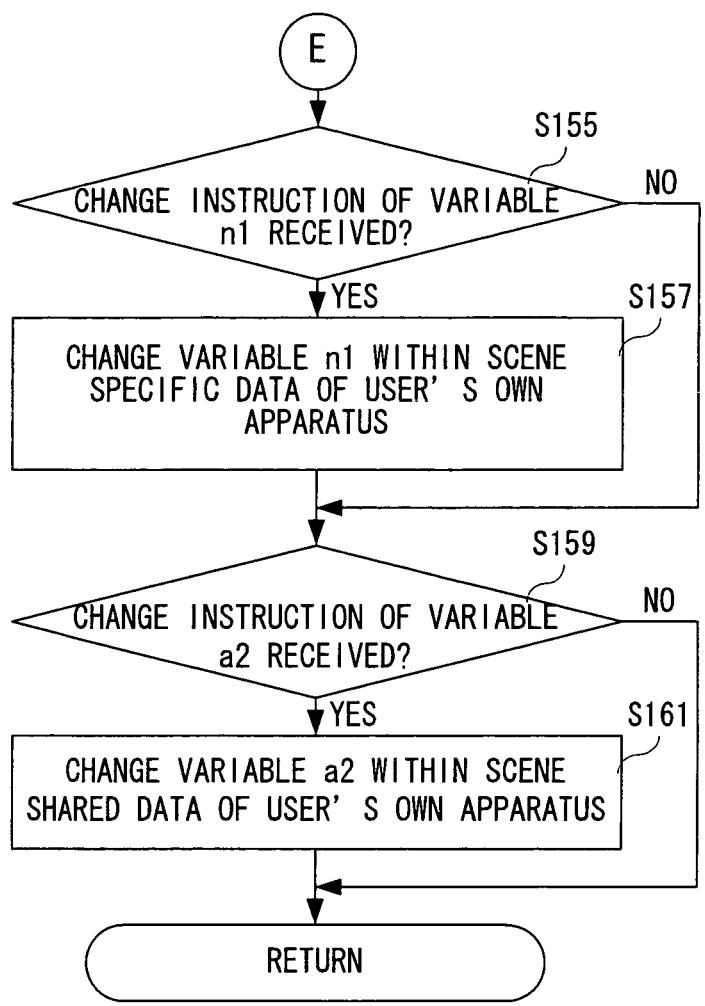
FIG. 22 is a flowchart showing another part of the game data updating process for a scene visitor, and continuing from FIG. 21.

FIG. 21 and FIG. 22 are a flowchart showing a game data updating process for a scene visitor (the above-described step S35, S69, S89). The game data updating process is executed in a case that the user's own apparatus is a child device (scene visitor) in the scene irrespective of whether it is a network parent device or a network child device. As shown in FIG. 21, when starting the game data updating process for a scene visitor, the CPU core 42 determines whether or not the variable a1, that is, the scene shared data is to be rewritten in a step S141. That is, it is determined whether or not the scene shared data ("variable a1", here) has to be rewritten according to the progress of the game. If "NO" in the step S141, that is, if the variable a1 is not rewritten, the process directly proceeds to a step S151. However, If "YES" in the step S141, that is, if the variable a1 is rewritten, the scene host is requested to lock the variable a1 in a step S143.

In a succeeding step S145, it is determined whether a lock notification is received from the scene host. If "YES" in the step S145, that is, if the lock notification is received from the scene host, the scene host is requested to change the variable a1 in a step S147, and then, the process proceeds to the step S151. However, if "NO" in the step S145, that is, if there is no lock notification from the scene host, it is determined that a request denial is received from the scene host in a step S149. If "NO" in the step S149, that is, if a request denial is not received, the process directly proceeds to a step S155 shown in FIG. 22. However, if "YES" in the step S149, that is, if the request denial is received, the process proceeds to the step S151.

In the step S151, it is determined whether or not a change instruction of the variable a1 is received. That is, it is determined whether or not there is a change instruction of the variable a1 from a scene host (another game apparatus 10) of another scene. If "NO" in the step S151, that is, if there is no change instruction of the variable a1, the process proceeds to the step S155. However, if "YES" in the step S151, the variable a1 within the scene shared data of the user's own apparatus is changed in a step S153, and then, the process proceeds to the step S155.

As shown in FIG. 22, in the step S155, it is determined whether or not the variable n1, that is, the change instruction of the scene specific data is received from the scene host. If "NO" in the step S155, that is, if the change instruction of the variable n1 is not received, the process directly proceeds to a step S159. However, If "YES" in the step S155, that is, if the change instruction of the variable n1 is received, the variable n1 of the scene specific data within the scene specific data of the user's own apparatus is changed in a step S157, and then, the process proceeds to the step S159.

In the step S159, it is determined whether or not a change instruction of the variable a2 is received from the scene host of another scene (scene 2, here). If "NO" in the step S159, that is, if the change instruction of the variable a2 is not received, the game data updating process for a scene visitor is directly returned. However, if "YES" in the step S159, that is, the change instruction of the variable a2 is received, the variable a2 within the scene shared data of the user's own apparatus is changed in a step S161, and then, the game data updating process for a scene visitor is returned.

Figure 23:
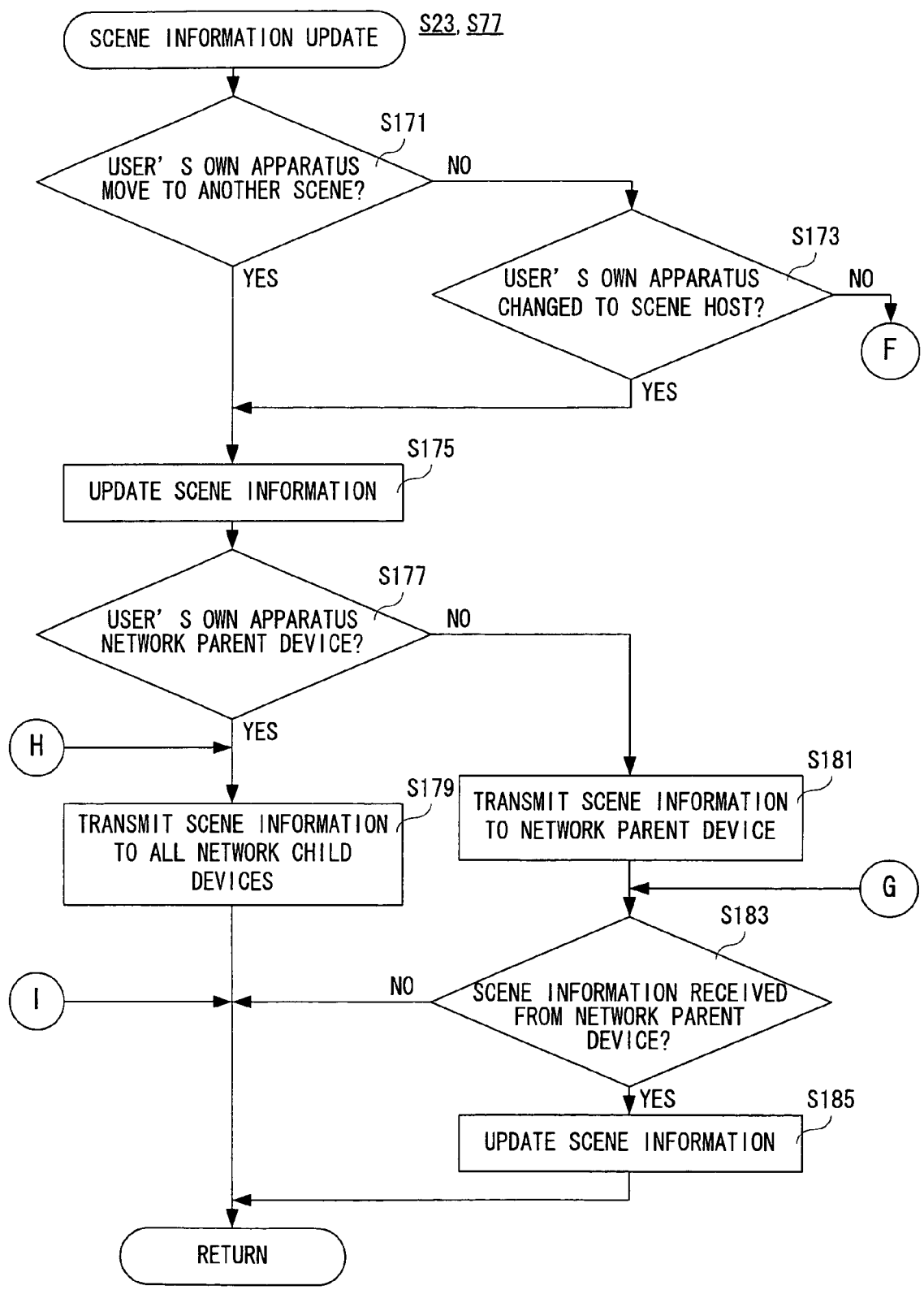
FIG. 23 is a flowchart showing a part of a scene information updating process.
Figure 24:
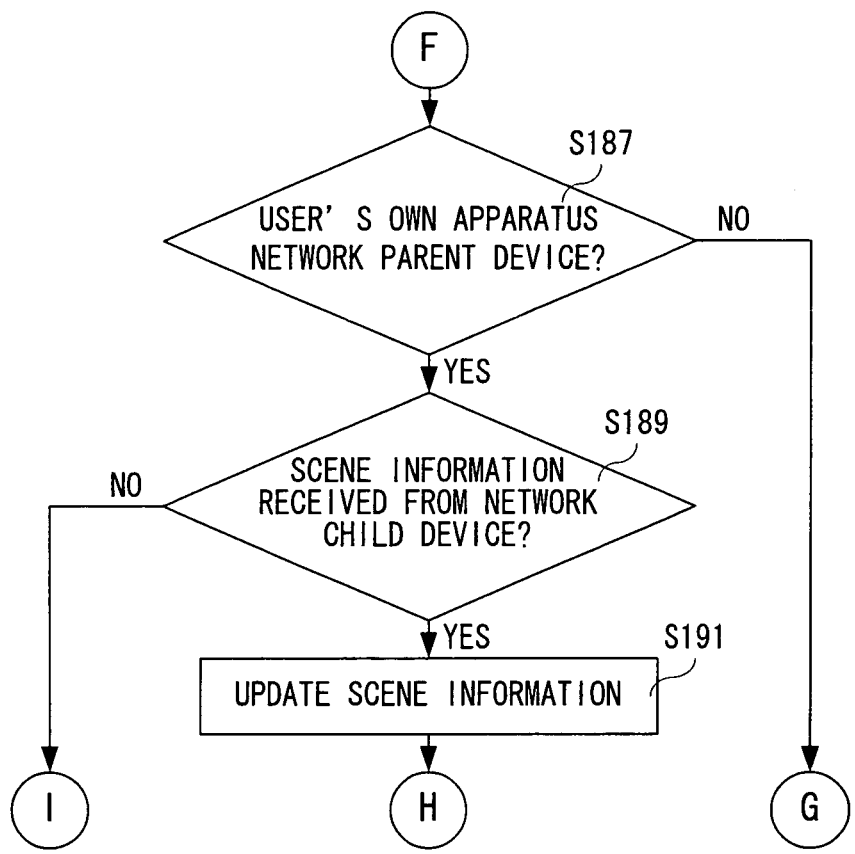
FIG. 24 is a flowchart showing another part of the scene information updating process.

FIG. 23 and FIG. 24 are a flowchart showing a scene information updating process in the above-described steps S23 and S77. Referring to FIG. 23, when starting the scene information updating process, the CPU core 42 determines whether or not the user's own apparatus moves to another scene in a step S171. If "YES" in the step S171, that is, if the user's own apparatus moves to another scene, the scene information, that is, at least one of the scene number data 780 and scene host data 782 is updated in a step S175, and so forth. However, if "NO" in the step S171, that is, if the user's own apparatus does not move to another scene, it is determined whether or not the user's own apparatus is changed to the scene host in a step S173.

If "NO" in the step S173, that is, if it is not changed to the scene host, the process proceeds to a step S187 shown in FIG. 24. However, If "YES" in the step S173, that is, if it is changed to the scene host, the process proceeds to the step S175 to update the scene host data 782.

When the scene information is updated in the step S175, it is determined whether or not the user's own apparatus is a network parent device in a step S177. If "YES" in the step S177, that is, if the user's own apparatus is a network parent device, the scene information is transmitted to all the network child devices in a step S179, and then, the scene information updating process is returned. On the other hand, if "NO" in the step S177, that is, if the user's own apparatus is a network child device, the scene information is transmitted to the network parent device in a step S181.

Succeedingly, in a step S183, it is determined whether or not the scene information is received from the network parent device. If "NO" in the step S183, that is, if the scene information is not received form the network parent device, the scene information updating process is directly returned. However, if "YES" in the step S183, that is, if the scene information is received from the network parent device, the scene information is updated in a step S185, and then, the scene information updating process is returned.

As described above, if "NO" in the step S173, it is determined whether or not the user's own apparatus is a network parent device in the step S187 shown in FIG. 24. If the user's own apparatus is not a network parent device in the step S187, the process directly proceeds to the step S183 shown in FIG. 23. However, if "YES" in the step S187, that is, if the user's own apparatus is a network parent device, it is determined whether or not the scene information is received from the network child device in a step S189. If "NO" in the step S189, that is, if the scene information is not received from the network child device, the scene information updating process is returned as shown in FIG. 23. On the other hand, if "YES" in the step S189, that is, if the scene information is received from the network child device, the scene information is updated in a step S191, and then, the process returns to the step S179 shown in FIG. 23.

Figure 25:
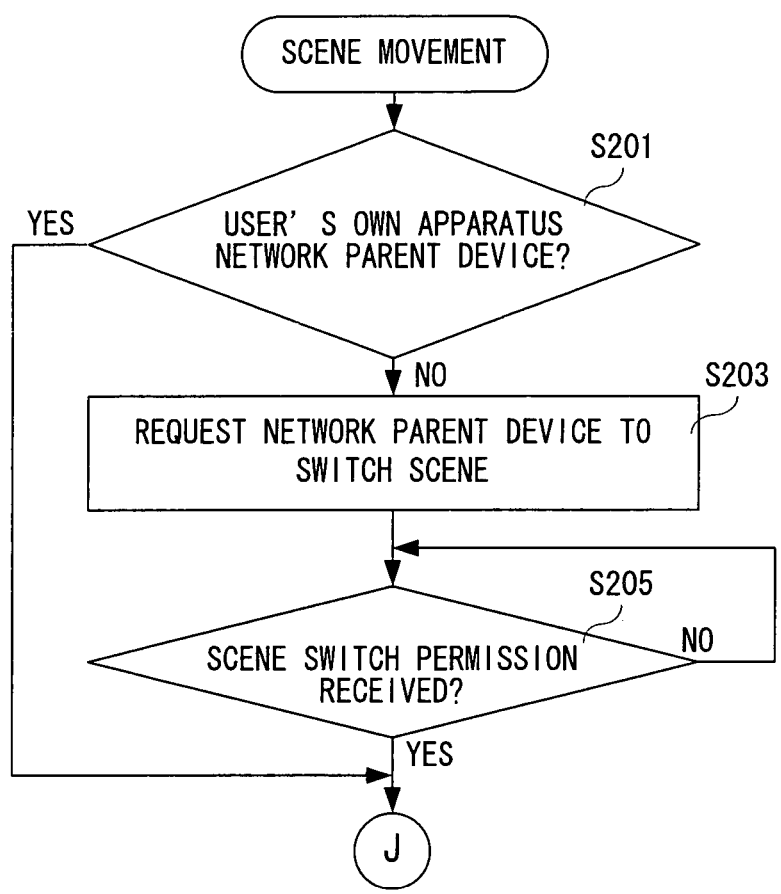
FIG. 25 is a flowchart showing a part of a scene movement process.
Figure 26:
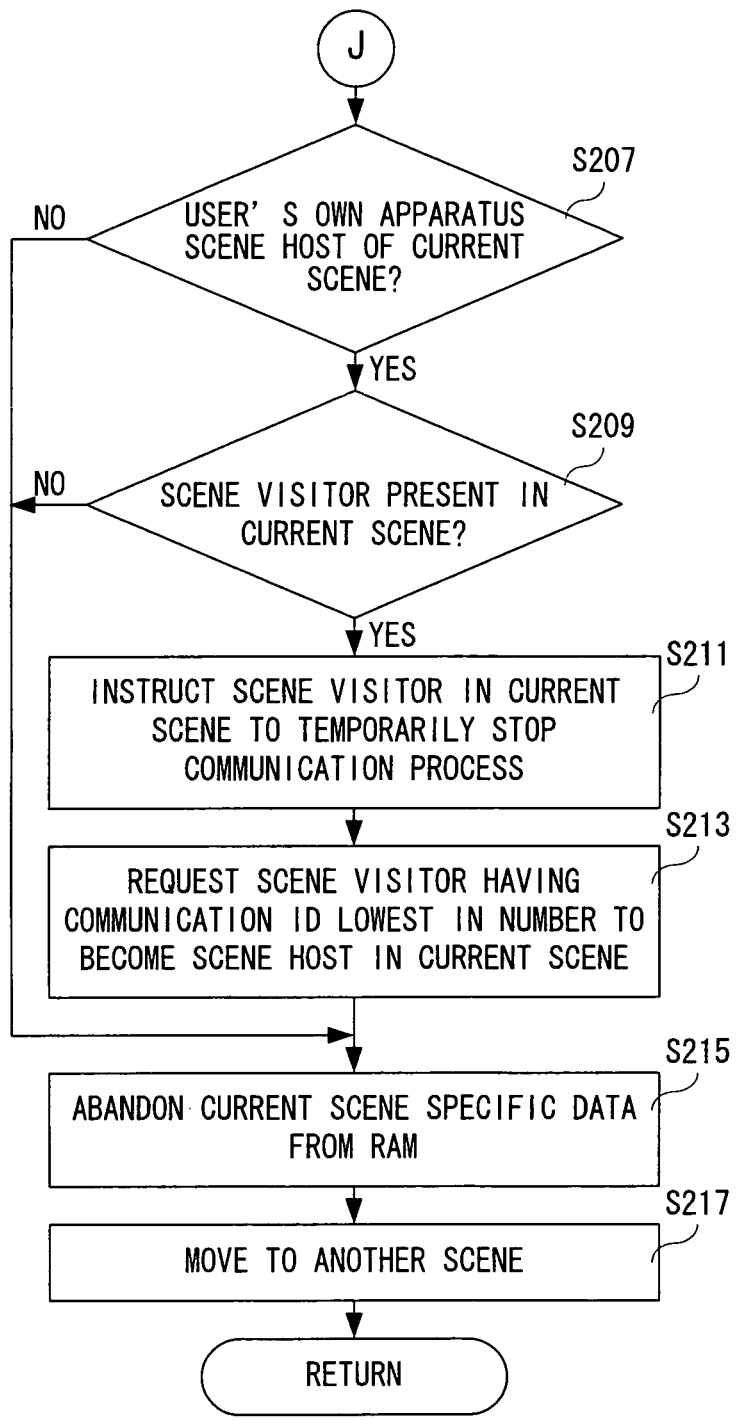
FIG. 26 is a flowchart showing another part of the scene movement process, and continuing from FIG. 25.

FIG. 25 and FIG. 26 are a flowchart showing a scene movement process. The scene movement process is common to both of the network parent device and the network child device. In addition, the scene movement process is executed by interruption in response to an instruction of a scene movement by the user or in accordance with occurrence of a predetermined event in a communication game which the respective game apparatuses 10 comprising the game system 100 play. Accordingly, during the execution of the scene movement process, the process of the communication game is temporarily stopped.

Referring to FIG. 25, when starting the scene movement process, the CPU core 42 determines whether or not the user's own apparatus is a network parent device in a step S201. If "YES" in the step S201, that is, if the user's own apparatus is a network parent device, the process directly proceeds to a step S207 shown in FIG. 26. However, If "NO" in the step S201, that is, if the user's own apparatus is a network child device, the network parent device is requested to switch the scene in a step S203. Then, in a step S205, it is determined whether or not a scene switch permission is received. If "NO" in the step S205, that is, if the scene switch permission is not received, the process returns to the same step S205 to wait receipt of the scene switch permission. Although illustration is omitted, if the scene switch permission is not received as described later, a scene switch wait is received. Accordingly, the process returns to the step S205. On the other hand, if "YES" in the step S205, that is, if the scene switch permission is received, the process proceeds to the step S207.

As shown in FIG. 26, in the step S207, it is determined whether or not the user's own apparatus is the scene host of the current scene. If "NO" in the step S207, that is, if the user's own apparatus is a scene visitor of the current scene, the process directly proceeds to a step S215. On the other hand, if "YES" in the step S207, that is, if the user's own apparatus is the scene host of the current scene, it is determined whether or not a scene visitor exists in the current scene in a step S209. That is, referring the scene number data 780 included in the scene information, it is determined whether or not a game apparatus 10 having the scene number the same as that of the user's own apparatus exists.

If "NO" in the step S209, that is, if no scene visitor exists in the current scene, the process directly proceeds to the step S215. However, if "YES" in the step S209, that is, if a scene visitor exists in the current scene, the scene visitor in the current scene (all the scene visitors) is instructed to temporarily stop the communication process in a step S211. Although illustration is omitted, the communication game is also instructed to be temporarily stopped at this time. In a following step S213, a scene visitor having the communication ID the lowest in number is requested to become the scene host of the current scene.

Then, in the step S215, the scene specific data of the current scene is abandoned from the RAM 48, and after the user's own apparatus moves to another scene in a step S217, the scene movement process is returned.

It is noted that, although illustration is omitted, if the user's own apparatus moves to another scene (it is true for a case of participating in the scene), in a case that another game apparatus 10 exists in the scene after movement, the user's own apparatus is set as a scene visitor. Alternatively in a case that another game apparatus 10 does not exist in the scene after movement, the user's own apparatus is set as a scene host. This is set by the CPU core 42 updating the scene information.

Figure 27:
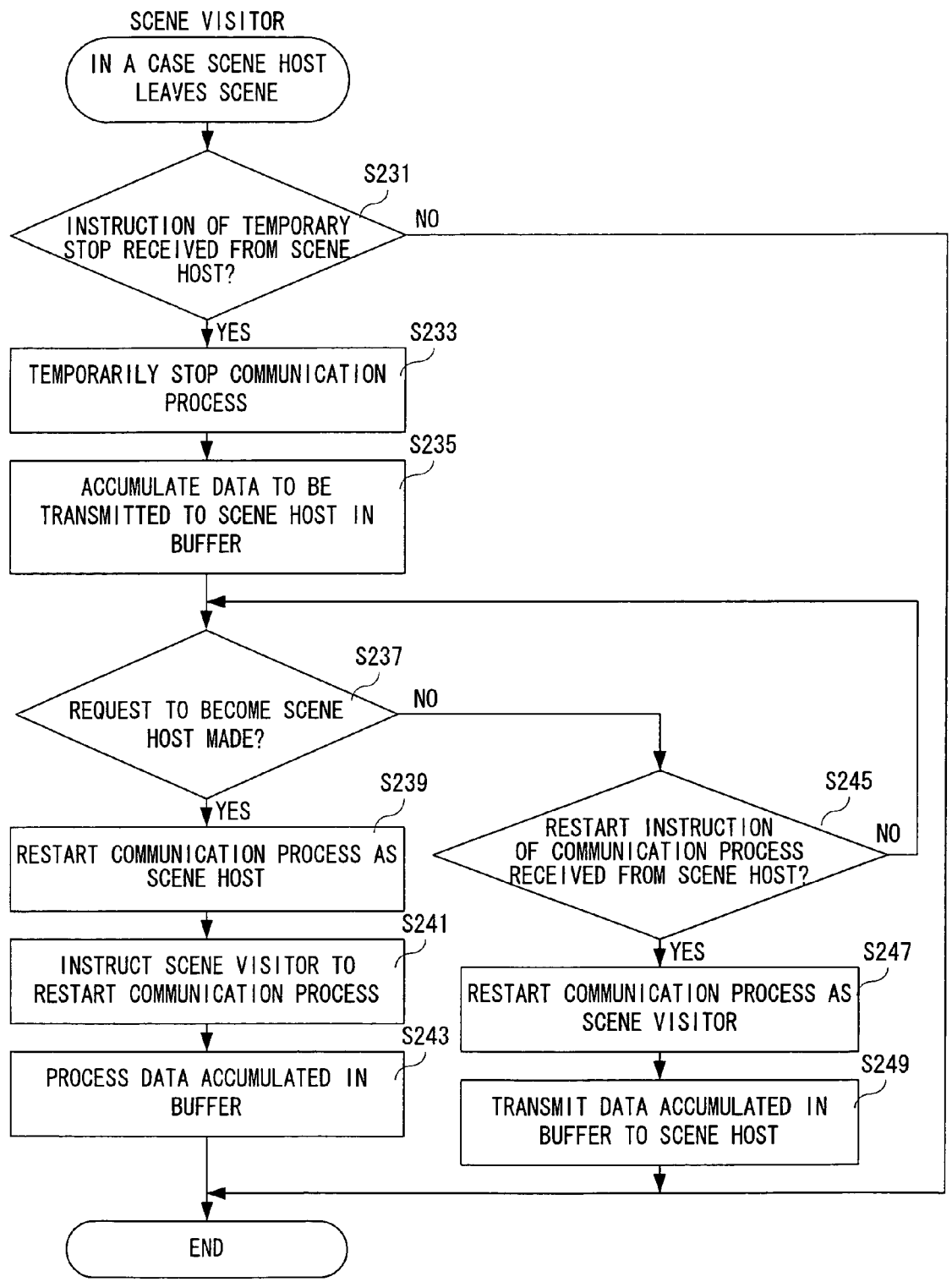
FIG. 27 is a flowchart showing a process of a scene visitor in a case that a scene host leaves the scene.

FIG. 27 is a flowchart showing a process of a scene visitor when a scene host leaves a scene. The process is executed at a predetermined time period if the game apparatus 10 is a scene visitor. Referring to FIG. 27, when starting a process in a case that a scene host leaves a scene, the CPU core 42 determines whether or not a pause instruction is received from the scene host in a step S231. If "NO" in the step S231, that is, if a pause instruction is not received from the scene host, the process in a case that the scene host leaves the scene is ended.

However, if "YES" in the step S231, that is, if a pause instruction is received form the scene host, a communication process is paused in a step S233. In addition, at this time, the process of the communication game is also paused. In a following step S235, data to be transmitted to the scene host is accumulated in a buffer. In a succeeding step S237, it is determined whether or not the user's own apparatus is requested to become a scene host. If "YES" in the step S237, that is, if it is requested to become a scene host, a communication process is restarted as a scene host in a step S239. At this time, the communication game is also restarted. Then, in a step S241, a scene visitor is instructed to restart the communication process, and in a step S243, the data accumulated in the buffer is processed, and then the process in a case that the scene host leaves a scene is ended.

It is noted that, when the communication process is restarted as a scene host in the step S239, if no scene visitor exists in the current scene, the process in the step S243 is directly executed without the process in the step S241 being executed.

Also, if "NO" in the step S237, that is, if the user's own apparatus is not requested to become a scene host, it is determined whether or not a restart instruction of the communication process is received from the scene host in a step S245. If "NO" in the step S245, that is, if a restart instruction of the communication process is not received from the scene host, the process directly returns to the step S237. On the other hand, if "YES" in the step S245, that is, if a restart instruction of the communication process is received from the scene host, a communication process is restarted as a scene visitor in a step S247. At this time, the process of the communication game is also restarted. Then, in a step S249, the data to be accumulated in the buffer is transmitted to the scene host, and then, the process in a case that the scene host leaves a scene is ended.

Figure 28:
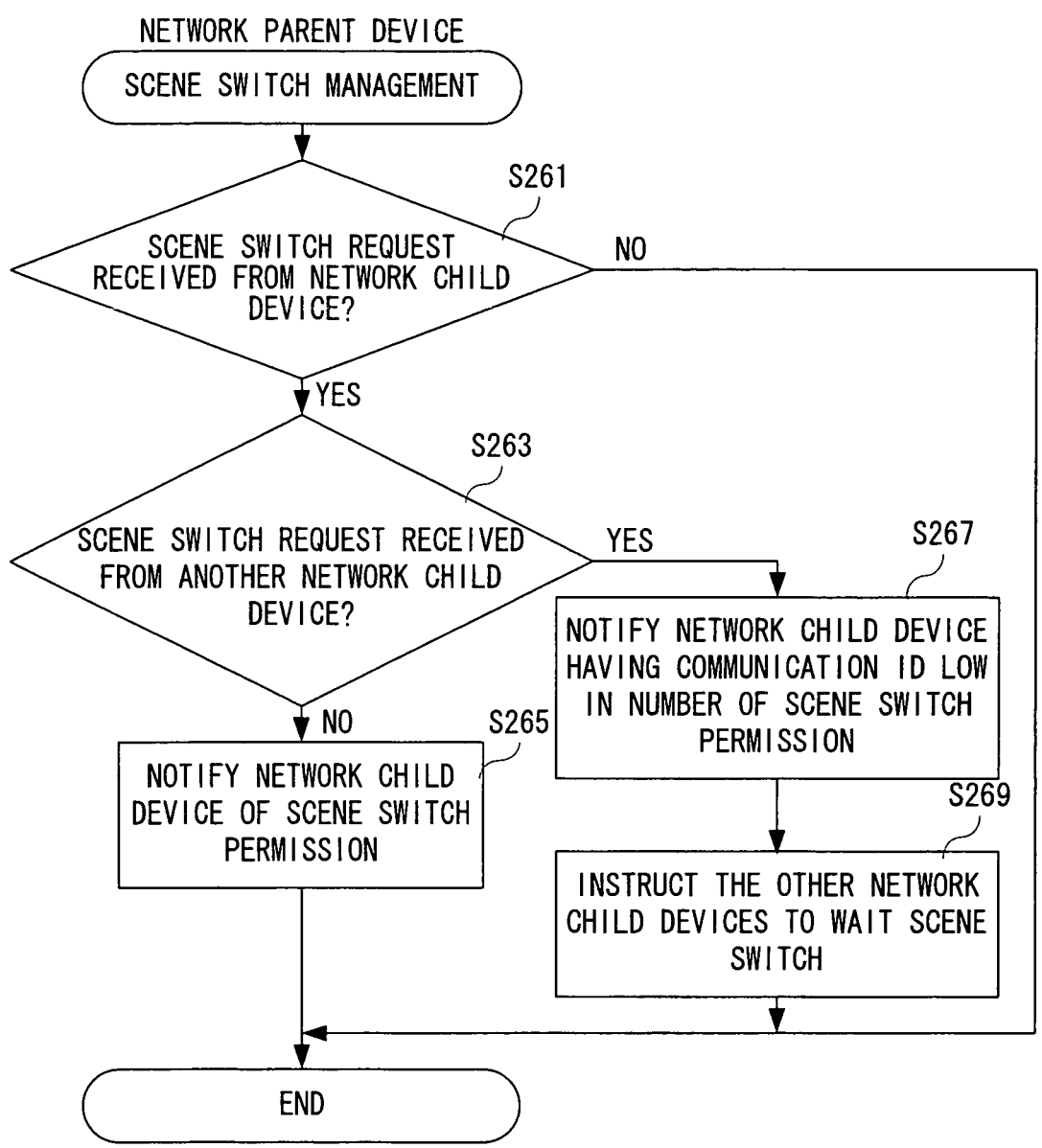
FIG. 28 is a flowchart showing a scene switch management process of a network parent device.

FIG. 28 is a flowchart showing a scene switch management process in the network parent device. That is, the network parent device executes a scene switch management process at the same time in addition to the communication process and the process in the communication game shown in FIG. 15 and FIG. 16. Referring to FIG. 28, when starting a scene switch process, the CPU core 42 determines whether or not a scene switch request is received from a network child device in a step S261. If "NO" in the step S261, that is, if the scene switch request is not received from the network child device, the scene switch process is directly ended.

However, if "YES" in step S261, that is, if a scene switch request is received from the network child device, it is determined whether or not a scene switch request is simultaneously received from another network child device in a step S263. It is noted that it is need not to be strictly the same time, and a time lag of about several μs may be included. If "NO" in the step S263, that is, if a scene switch request is not received from another network child device, the network child device making a scene switch request is notified of a scene switch permission in a step S265, and then, the scene switch management process is ended.

Alternatively, if "YES" in the step S263, that is, if a scene switch request is simultaneously received from another network child device, a network child device having the communication ID lower in number is notified of a switch permission in a step S267, a scene switch wait is instructed to the other network child devices in a step S269, and then, the scene switch management process is ended.

According to the certain exemplary embodiments, a scene host is determined for each scene included in the virtual game space, and the processes are shared with the respective scene hosts in the respective scenes, eliminating concentration of a processing load into a network parent device. Thus, in a case that the number of the game apparatuses to be communicated is increased, a processing load for a network parent device is not increased, capable of preventing communication efficiency from being reduced. In addition, the scene specific data merely includes specific data of a scene where the user's own apparatus participates in is stored, and therefore, even if the number of the scenes comprising the virtual game space increases, an available are of the memory is substantially reduced, capable of increasing efficiency of the memory.

It is noted that a description is made on a case that the system is constructed by game apparatuses each integrally provided with a display in this exemplary embodiment, the exemplary embodiment may also be applied to a system comprising game apparatuses each separately having a display.

Furthermore, although the respective game apparatuses are connected in a wireless manner in this exemplary embodiment, these may be connected with wire or over the Internet network, etc. without being limited to the above description.

In addition, a structure of the game apparatus should not be limited to that of the above-described exemplary embodiment. For example, a single LCD may be possible, or a touch panel may be provided on both of the two LCDs. Also, two speakers may be provided at the right and left.

Although certain exemplary embodiments have been described and illustrated in detail, it is clearly understood that the same is by way of illustration and example only and is not to be taken by way of limitation, the spirit and scope of these certain exemplary embodiments being limited only by the terms of the appended claims.

What is claimed is:

1. A game system which includes a plurality of game apparatuses each having a communication function, and where each of said plurality of game apparatuses participates in any one of a scene of a virtual game space including a plurality of scenes, each of said game apparatuses including:
    a shared game data storage that stores shared game data to be shared with all of said game apparatuses;
    a specific game data storage that stores scene specific game data to be shared in only a scene in which a user's own apparatus participates;
    a parent device setter that sets the user's own apparatus as a parent device of said scene in which no other game apparatuses participates;
    child device setter that sets the user's own apparatus as a child device in said scene when any one of the other game apparatuses participates in said scene in which said user's own apparatus participates and any one of the other game apparatuses is set as a parent device;
    a parent device processing unit that, when the user's own apparatus is set as a parent device, instructs all the game apparatuses except for the user's own apparatus to update said shared game data in a case that a first condition is satisfied, or instructs all the child devices which participate in said scene to update said specific game data in a case that a second condition different from said first condition is satisfied; and
    a child device processing unit that updates said specific game data according to an instruction from said parent device when the user's own apparatus is set as a child device of said scene by said child device setter.

2. A game system according to claim 1, wherein
    said child device processing unit includes a shared game update requesting unit configured to request said parent device of said scene in which the user's own apparatus participates to update said shared game data, and
    said parent device processing unit is configured to instruct all said game apparatuses except for the user's own apparatus to update said shared game data on receipt of the update request of said shared game data from said child device.

3. A game system according to claim 1,
further comprising an update instruction receiver configured to receive an update instruction of said shared game data from any one of the other game apparatuses, and a shared game data updating unit configured to update said shared game data on receipt of an update instruction of said shared game data by said update instruction receiver.

4. A game system according to claim 1,
further comprising a child device presence or absence determining unit configured to determine whether or not a child device exists in a current scene in a case that the user's own apparatus is a parent device after moving to another scene, and a parent device setting request unit configured to request one child device selected according to a predetermined rule to become a parent device when it is determined that a child device exists in the current scene by said child device presence or absence determining unit.

5. A game system according to claim 4,
further comprising a parent device setting request determining unit configured to determine whether or not the user's own apparatus is requested to become a parent device from any one of the other game apparatuses, and a setting modification unit configured to set the user's own apparatus as a parent device when it is determined that the user's own apparatus is requested to become a parent device by said parent device setting request determining unit.

6. A game system according to claim 1,
further comprising a scene information storage configured to store scene identification information as to a scene in which each of said game apparatuses participates and parent/child setting information for indicating whether each of said game apparatuses is set to become a parent device or a child device.

7. A game system according to claim 6,
further comprising a scene information updating unit configured to update said scene information at least when the user's own apparatus moves to another scene.

8. A game apparatus which participates in a virtual space including a plurality of scenes, and is for playing a game, comprising:
a processor;
a memory coupled to said processor, said memory storing instructions that, when executed by said processor, control said processor to:
store shared game data to be shared with all of the game apparatuses playing said game;
store scene specific game data to be shared in only a scene in which a user's own apparatus participates;
set the user's own apparatus as a parent device of said scene when none of said other game apparatuses participates in said scene in which said user's own apparatus participates;
set the user's own apparatus as a child device in said scene when any one of the other game apparatuses participates in said scene in which said user's own apparatus participates and any one of the other game apparatuses is set as a parent device;
when the user's own apparatus is set as a parent device, instruct all the game apparatuses except for the user's own apparatus to update said shared game data in a case that a first condition is satisfied, or instruct all the child devices which participate in said scene to update said specific game data in a case that a second condition different from said first condition is satisfied; and
update said specific game data according to an instruction from said parent device when the user's own apparatus is set as a child device of said scene.

9. A game apparatus according to claim 8, wherein
said processor is further configured to request said parent device participating in said scene in which the user's own apparatus participates to update said shared game data, and
said processor is further configured to instruct all said game apparatuses except for the user's own apparatus to update said shared game data on receipt of the update request of said shared game data from said child device.

10. A game apparatus according to claim 8, wherein said processor is further configured to receive an update instruction of said shared game data from any one of said other game apparatuses, and to update said shared game data on receipt of the update instruction of said shared game data.

11. A game apparatus according to claim 8, wherein said processor if further configured to determine whether or not a child device exists in a current scene if the user's own apparatus is a parent device when moving to another scene, and to request one child device selected according to a predetermined rule to become a parent device when it is determined that there is a child device in the current scene.

12. A game apparatus according to claim 11, wherein said processor is further configured to determine whether or not the user's own apparatus is requested to become a parent device from any one of said the other game apparatuses, and to set the user's own apparatus as a parent device when it is determined that the user's own apparatus is requested to become a parent device.

13. A game apparatus according to claim 8, wherein said processor is further configured to store scene information including scene identification information as to a scene in which each of said game apparatuses participates and parent/child setting information for indicating whether each of said game apparatuses is set to become a parent device or a child device.

14. A game apparatus according to claim 13, wherein said processor is further configured to update said scene information at least when the user's own apparatus moves to another scene.

15. A non-transitory storage medium storing a game program of a game apparatus which participates in a virtual space including a plurality of scenes, and is for playing a game, said game apparatus comprises a shared game data storage for storing shared game data to be shared with all the game apparatuses playing said game; and a specific game data storage for storing scene specific game data to be shared in only a scene where a user's own apparatus participates in;
said game program causes a processor of said game apparatus to execute:
setting the user's own apparatus as a parent device of said scene in which no other game apparatuses participates;
setting the user's own apparatus as a child device in said scene when any other game apparatuses participates in said scene in which said user's own apparatus participates and any one of the other game apparatuses is set as a parent device;
instructing all the game apparatuses except for the user's own apparatus, when the user's own apparatus is set as a parent device, to update said shared game data if a first condition is satisfied, or instructing all the child devices which participate in said scene to update said specific game data if a second condition different from said first condition is satisfied; and updating said specific game data according to an instruction from said parent device when the user's own apparatus is set as a child device of said scene.

16. A storage medium storing a game program according to claim 15, wherein said setting the user's own apparatus as a child device includes requesting said parent device participating in said scene in which the user's own apparatus participates to update said shared game data, and said setting the user's own apparatus as a parent device includes instructing all said game apparatuses except for the user's own apparatus to update said shared game data on receipt of the update request of said shared game data from said child device.

17. A storage medium storing a game program according to claim 15, wherein said game program causes said processor to execute receiving an update instruction of said shared game data from said any one of the other said game apparatuses, and updating said shared game data on receipt of the update instruction of said shared game data.

18. A storage medium storing a game program according to claim 15, wherein said game program causes said processor to execute determining whether or not a child device exists in a current scene if the user's own apparatus is a parent device after moving to another scene, and requesting one child device selected according to a predetermined rule to become a parent device when it is determined that there is a child device in the current scene.

19. A storage medium storing a game program according to claim 18, wherein said game program causes said processor to execute determining whether or not the user's own apparatus is requested to become a parent device from any one of said the other game apparatuses, and setting the user's own apparatus as a parent device when it is determined that the user's own apparatus is requested to become a parent device.

20. A storage medium storing a game program according to claim 15, further comprising storing scene information including scene identification information as to a scene where each of said game apparatuses participates in and parent/child setting information for indicating whether each of said game apparatuses is set to become a parent device or a child device, and updating said scene information at least when the user's own apparatus moves to another scene.

21. A method of controlling a game apparatus which participates in a virtual space including a plurality of scenes and is for playing a game, and comprising a shared game data storage configured to store shared game data to be shared with all game apparatuses playing said game, a specific game data storage configured to store scene specific game data to be shared in only a scene in which a user's own apparatus participates, comprising setting the user's own apparatus as a parent device of said scene when no other game apparatuses participate in said scene, setting the user's own apparatus as a child device in said scene when any one of the other game apparatuses does not participate in said scene where said user's own apparatus participates in and any one of the other game apparatuses is set as a parent device, instructing all the game apparatuses except for the user's own apparatus, when the user's own apparatus is set as a parent device, to update said shared game data if a first condition is satisfied, or instructing all the child devices which participate in said scene to update said specific game data if a second condition different from said first condition is satisfied, and updating said specific game data according to an instruction from said parent device when the user's own apparatus is set as a child device.

22. A game controlling method according to claim 21, wherein the updating said specific game data according to an instruction from the parent device when the user's own apparatus is set as a child device comprises requesting said parent device participating in said scene in which the user's own apparatus participates to update said shared game data, and instructing all said game apparatuses except for the user's own apparatus to update said shared game data on receipt of the update request of said shared game data from said child device.

23. A game controlling method according to claim 21, further comprising: receiving an update instruction of said shared game data from any one of said other game apparatuses, and updating said shared game data on receipt of an update instruction of said shared game data.

24. A game controlling method according to claim 21, further comprising:

determining whether a child device exists in a current scene in a case that the user's own apparatus is a parent device when moving to another scene, and requesting one child device selected according to a predetermined rule to become a parent device when it is determined that a child device exists in the current scene.

25. A game controlling method according to claim 24, further comprising: determining whether or not the user's own apparatus is requested to become a parent device from any one of the other game apparatuses, and setting the user's own apparatus as a parent device when it is determined that the user's own apparatus is requested to become a parent device.

26. A game controlling method according to claim 21, said game apparatus further comprising a scene information storage configured to store scene information including scene identification information as to a scene in which each of said game apparatuses participates, and parent child setting information for indicating whether each of said game apparatuses is a parent device or a child device, the method further comprising updating said scene information at least when the user's own apparatus moves to another scene.

* * * * *